United States Patent
Nakao

(10) Patent No.: US 7,672,385 B2
(45) Date of Patent: *Mar. 2, 2010

(54) RADIO APPARATUS

(75) Inventor: Seigo Nakao, Gifu (JP)

(73) Assignee: Sanyo Electric Co., Ltd., Osaka (JP)

(*) Notice: Subject to any disclaimer, the term of this patent is extended or adjusted under 35 U.S.C. 154(b) by 765 days.

This patent is subject to a terminal disclaimer.

(21) Appl. No.: 11/485,990

(22) Filed: Jul. 14, 2006

(65) Prior Publication Data

US 2007/0014375 A1   Jan. 18, 2007

Related U.S. Application Data

(60) Provisional application No. 60/699,506, filed on Jul. 15, 2005, provisional application No. 60/699,856, filed on Jul. 18, 2005, provisional application No. 60/699,847, filed on Jul. 18, 2005, provisional application No. 60/717,201, filed on Sep. 16, 2005.

(51) Int. Cl.
*H04K 1/10* (2006.01)
*H04L 27/28* (2006.01)

(52) U.S. Cl. .................. 375/260; 370/206; 370/319; 370/320; 370/321

(58) Field of Classification Search ......... 375/135–136, 375/140–141, 145–147, 260; 370/203–211, 370/319–321, 335–347
See application file for complete search history.

(56) References Cited

U.S. PATENT DOCUMENTS

2004/0218523 A1* 11/2004 Varshney et al. ............ 370/208
2007/0014227 A1*  1/2007 Nakao ........................ 370/203

FOREIGN PATENT DOCUMENTS

JP     2006-176562 A     6/2006

OTHER PUBLICATIONS

Coleri, Sinem et al.: "Channel Estimation Techniques Based on Pilot Arrangement in OFDM Systems," IEEE Transactions on Broadcasting, vol. 48, No. 3, pp. 223-229, Sep. 2002.

* cited by examiner

*Primary Examiner*—Curtis B Odom
(74) *Attorney, Agent, or Firm*—McDermott Will & Emery LLP

(57) ABSTRACT

A modem unit inputs a combination, of control signal and data signal, which is to use a plurality of subcarriers. Among a plurality of combinations inputted, the modem unit performs interleaving with a size defined by the first number of subcarriers on a control signal and performs interleaving with the size defined by the second number of subcarriers on a data signal. The modem unit appends additional signals to control signals contained in the second and the subsequent combinations in a plurality of combinations interleaved. The modem unit appends additional signals whose number of subcarriers is equal to the difference between the first number of subcarriers and the second number of subcarriers.

11 Claims, 18 Drawing Sheets

FIG.9A

| L-STF | HT-LTF | HT-SIG | -HT-LTF | HT-LTF | -HT-LTF | DATA 1 |
|---|---|---|---|---|---|---|
| L-STF 400ns | HT-LTF 400ns | HT-SIG 400ns | HT-LTF 400ns | HT-LTF 400ns | HT-LTF 400ns | DATA 2 |
| L-STF 200ns | HT-LTF 200ns | HT-SIG 200ns | -HT-LTF 200ns | -HT-LTF 200ns | HT-LTF 200ns | DATA 3 |
| L-STF 600ns | HT-LTF 600ns | HT-SIG 600ns | HT-LTF 600ns | -HT-LTF 600ns | -HT-LTF 600ns | DATA 4 |

FIG.9B

| L-STF | L-LTF | L-SIG | HT-SIG | HT-STF | HT-LTF | -HT-LTF | HT-LTF | -HT-LTF | DATA 1 |
|---|---|---|---|---|---|---|---|---|---|
| L-STF 50ns | L-LTF 50ns | L-SIG 50ns | HT-SIG 400ns | HT-STF 400ns | HT-LTF 400ns | HT-LTF 400ns | HT-LTF 400ns | HT-LTF 400ns | DATA 2 |
| L-STF 100ns | L-LTF 100ns | L-SIG 100ns | HT-SIG 200ns | HT-STF 200ns | HT-LTF 200ns | -HT-LTF 200ns | -HT-LTF 200ns | HT-LTF 200ns | DATA 3 |
| L-STF 150ns | L-LTF 150ns | L-SIG 150ns | HT-SIG 600ns | HT-STF 600ns | HT-LTF 600ns | HT-LTF 600ns | -HT-LTF 600ns | -HT-LTF 600ns | DATA 4 |

FIG.10A

| L-STF | L-LTF | L-SIG | HT-SIG | HT-STF | HT-LTF | -HT-LTF | HT-LTF | -HT-LTF | DATA 1 |
|---|---|---|---|---|---|---|---|---|---|
| L-STF -50ns | L-LTF -50ns | L-SIG -50ns | HT-SIG -50ns | HT-STF -400ns | HT-LTF -400ns | -HT-LTF -400ns | HT-LTF -400ns | -HT-LTF -400ns | DATA 2 -400ns |
| L-STF -100ns | L-LTF -100ns | L-SIG -100ns | HT-SIG -100ns | HT-STF -200ns | HT-LTF -200ns | -HT-LTF -200ns | -HT-LTF -200ns | HT-LTF -200ns | DATA 3 -200ns |
| L-STF -150ns | L-LTF -150ns | L-SIG -150ns | HT-SIG -150ns | HT-STF -600ns | HT-LTF -600ns | HT-LTF -600ns | -HT-LTF -600ns | -HT-LTF -600ns | DATA 4 -600ns |

FIG.10B

| L-STF | L-LTF | L-SIG | HT-SIG | HT-STF | HT-LTF | HT-LTF | DATA 1 |
|---|---|---|---|---|---|---|---|
| L-STF -50ns | L-LTF -50ns | L-SIG -50ns | HT-SIG -50ns | HT-STF -400ns | HT-LTF -400ns | -HT-LTF -400ns | DATA 2 -400ns |

FIG.10C

| L-STF | L-LTF | L-SIG | HT-SIG | HT-STF | HT-LTF | -HT-LTF | HT-LTF | -HT-LTF | DATA 1 |
|---|---|---|---|---|---|---|---|---|---|
| L-STF -50ns | L-LTF -50ns | L-SIG -50ns | HT-SIG -50ns | HT-STF Ans | HT-LTF Ans | HT-LTF Ans | HT-LTF Ans | HT-LTF Ans | DATA 2 Ans |
| L-STF -100ns | L-LTF -100ns | L-SIG -100ns | HT-SIG -100ns | HT-STF Bns | HT-LTF Bns | -HT-LTF Bns | -HT-LTF Bns | HT-LTF Bns | DATA 3 Bns |
| L-STF -150ns | L-LTF -150ns | L-SIG -150ns | HT-SIG -150ns | HT-STF Cns | HT-LTF Cns | -HT-LTF Cns | -HT-LTF Cns | HT-LTF Cns | DATA 4 Cns |

FIG.10D

| L-STF | L-LTF | L-SIG | HT-SIG | HT-STF | HT-LTF | HT-LTF | DATA 1 |
|---|---|---|---|---|---|---|---|
| L-STF -50ns | L-LTF -50ns | L-SIG -50ns | HT-SIG -50ns | HT-STF Ans | HT-LTF Ans | -HT-LTF Ans | DATA 2 Ans |

FIG.11A

| L-STF | L-LTF | L-SIG' | HT-SIG1 | HT-SIG2 | -HT-LTF | HT-LTF | -HT-LTF | DATA 1 |
| L-STF -200ns | L-LTF -200ns | L-SIG' -200ns | HT-SIG1 -200ns | HT-SIG2 -200ns | HT-LTF -200ns | HT-LTF -200ns | HT-LTF -200ns | DATA 2 -200ns |
| L-STF -100ns | L-LTF -100ns | L-SIG' -100ns | HT-SIG1 -100ns | HT-SIG2 -100ns | -HT-LTF -100ns | -HT-LTF -100ns | -HT-LTF -100ns | DATA 3 -100ns |
| L-STF 100ns | L-LTF 100ns | L-SIG' 100ns | HT-SIG1 100ns | HT-SIG2 100ns | HT-LTF 100ns | HT-LTF 100ns | -HT-LTF 100ns | DATA 4 100ns |

FIG.11B

| L-STF | L-LTF | L-SIG' | HT-SIG1 | HT-SIG2 | HT-LTF | -HT-LTF | DATA 1 |
| L-STF -200ns | L-LTF -200ns | L-SIG' -200ns | HT-SIG1 -200ns | HT-SIG2 -200ns | HT-LTF -200ns | -HT-LTF -200ns | DATA 2 -200ns |

| L-STF1 | L-LTF1 | L-SIG1' | HT-SIG1' | HT-SIG2' | HT-LTF1 | HT-LTF5 | HT-LTF9 | DATA 3 |
| L-STF2 -50ns | L-LTF2 -50ns | L-SIG2' -50ns | HT-SIG1'' -50ns | HT-SIG2'' -50ns | HT-LTF2 -50ns | HT-LTF6 -50ns | HT-LTF10 -50ns | DATA 4 -50ns |
| L-STF3 -100ns | L-LTF3 -100ns | L-SIG3' -100ns | HT-SIG1''' -100ns | HT-SIG2''' -100ns | HT-LTF3 -100ns | HT-LTF7 -100ns | HT-LTF11 -100ns | DATA 5 -100ns |
| L-STF4 -150ns | L-LTF4 -150ns | L-SIG4' -150ns | HT-SIG1'''' -150ns | HT-SIG2'''' -150ns | HT-LTF4 -150ns | HT-LTF8 -150ns | HT-LTF12 -150ns | DATA 6 -150ns |

RADIO APPARATUS

RELATED APPLICATIONS

This application claims priority of U.S. Provisional Application No. 60/699,506, filed on Jul. 15, 2005, U.S. Provisional Application No. 60/699,856, filed on Jul. 18, 2005, U.S. Provisional Application No. 60/699,847, filed on Jul. 18, 2005, and U.S. Provisional Application No. 60/717,201, filed Sep. 16, 2005, the disclosures of which Applications are incorporated by reference herein.

BACKGROUND OF THE INVENTION

1. Field of the Invention

The present invention relates to radio apparatus, and it particularly relates to a radio apparatus using multiple subcarriers.

2. Description of the Related Art

An OFDM (Orthogonal Frequency Division Multiplexing) modulation scheme is one of multicarrier communication schemes that can realize the high-speed data transmission and are robust in the multipath environment. This OFDM modulation scheme has been applied to the wireless standards such as IEEE802.11 a/g and HIPERLAN/2. The burst signals in such a wireless LAN are generally transferred via a time-varying channel environment and are also subject to the effect of frequency selective fading. Hence, a receiving apparatus generally carries out the channel estimation dynamically.

In order for the receiving apparatus to carry out the channel estimation, two kinds of known signals are provided within a burst signal. One is the known signal, provided for all carries in the beginning of the burst signal, which is the so-called preamble or training signal. The other one is the known signal, provided for part of carriers in the data area of the burst signal, which is the so-called pilot signal (See Reference (1) in the following Related Art List, for instance).

Related Art List (1) Sinem Coleri, Mustafa Ergen, Anuj Puri and Ahmad Bahai, "Channel Estimation Techniques Based on Pilot Arrangement in OFDM Systems", *IEEE Transactions on broadcasting*, vol. 48, No. 3, pp. 223-229, September 2002.

In wireless communications, adaptive array antenna technology is one of the technologies to realize the effective utilization of frequency resources. In adaptive array antenna technology, the directional patterns of antennas are controlled by controlling the amplitude and phase of signals, to be processed, in a plurality of antennas, respectively. One of techniques to realize higher data transmission rates by using such an adaptive array antenna technology is the MIMO (Multiple-Input Multiple-Output) system. In this MIMO system, a transmitting apparatus and a receiving apparatus are each equipped with a plurality of antennas, and packet signals to be transmitted in parallel are set (hereinafter, each of data to be transmitted in parallel in a packet signal is called "stream"). That is, streams up to the maximum number of antennas are set for the communications between the transmitting apparatus and the receiving apparatus so as to improve the data transmission rates.

Moreover, combining this MIMO system with the OFDM modulation scheme results in a higher data transmission rate. For the purpose of enhancing the transmission efficiency in this MIMO system, the data signals to be transmitted respectively in a plurality of packets are aggregated into a single packet. In so doing, the control signals are appended to the respective data signals. In other words, a plurality of combinations of control signals and data signals are contained in the packet signals. It is generally the case that the number of subcarries necessary for transmitting the control signal is smaller than the number of subcarriers necessary for transmitting the data signal. Accordingly, if the number of subcarriers used for the transmission of the control signal differs from that used for the transmission of the data signal, the signal strength varies periodically at the time of transmitting packets. That is, the signal strength is attenuated in part of the control signal. When such a fluctuation as this occurs, the signals received by the receiving apparatus also varies. As a result, the power of estimated channel characteristics do not match the power of control signals and thereby the receiving characteristics may possibly deteriorate as will be discussed.

In a MIMO system like this, it is generally the case that the number of subcarries necessary for transmitting the control signal is smaller than the number of subcarriers necessary for transmitting the data signal. The number of subcarriers in the known signal for use in estimating the channel characteristics is made equal to the number of subcarriers in the data signal. If the number of subcarriers used for the transmission of the control signal differs from that used for the transmission of the known signal, the power of estimated channel characteristics do not correspond to the power of control signals and thereby the receiving characteristics may possibly deteriorate as will be discussed.

SUMMARY OF THE INVENTION

The present invention has been made in view of the foregoing circumstances and a general purpose thereof is to provide a radio apparatus that transmits a plurality of combinations of control signal and data signal while maintaining the substantially constant strength. An advantage of the present invention is to provide a radio apparatus that receives the control signals accurately even when the number of subcarriers required of the transmission of a control signal is less than the number of subcarriers for a known signal.

In order to solve the above problems, a radio apparatus according to a preferred embodiment of the present invention comprises: an input unit which inputs a plurality of combinations of control signal and data signal wherein the combination uses a plurality of subcarriers; an interleave unit which performs interleaving of a size defined by a first number of subcarriers on a control signal and performs interleaving of a size defined by a second number of subcarriers on a data signal in the plurality of combinations inputted to the input unit; and an adding unit which adds an additional signal to a control signal contained in a second combination and the subsequent combination. The adding unit adds additional signals whose amount corresponds to a difference between the second number of subcarriers and the first number of subcarriers.

According to this embodiment, adding additional signals allows to make the first number of subcarriers equal to the second number of subcarriers, so that the variation in signal strength can be suppressed.

The additional signal inserted in the adding unit may be a dummy signal. In such a case, the processing can be executed in a simplified manner.

The additional signal inserted in the adding unit may be a signal for parity check. In such a case, the receiving characteristics can be enhanced.

Another preferred embodiment of the present invention relates also to radio apparatus. This apparatus comprises: an input unit which inputs a plurality of combinations of control signal and data signal wherein the combination uses a plurality of subcarriers; an adding unit which adds an additional signal to a control signal contained in a second combination and the subsequent combination; and an interleave unit which performs interleaving of a size defined by a first number of subcarriers on a control signal contained in a first combination and performs interleaving of a size defined by a second number of subcarriers on the remaining signals among a plurality of combinations in which the additional signal has been added by the adding unit. The adding unit adds additional signals whose amount corresponds to a difference between the second number of subcarriers and the first number of subcarriers.

According to this embodiment, the first number of subcarriers is made equal to the second number of subcarriers by attaching additional signals, so that the variation in signal strength can be suppressed.

The additional signal inserted in the adding unit may be a signal for cyclic redundancy check (CRC). In such a case, the receiving characteristics can be improved.

Still another preferred embodiment of the present invention relates also to a radio apparatus. This apparatus comprises: a receiver which receives a plurality of combinations of control signal and data signal wherein the combination uses a plurality of subcarriers; an excluding unit which excludes an additional signal from a control signal contained in a second combination and the subsequent combination among the plurality of combinations received by the receiver; and a deinterleave unit which performs deinterleaving of a size defined by a first number of subcarriers on a control signal and performs deinterleaving of a size defined by a second number of subcarriers on a data signal in a plurality of combinations in which the additional signal has been excluded by the excluding unit. The excluding unit excludes additional signals whose amount corresponds to a difference between the second number of subcarriers and the first number of subcarriers.

According to this embodiment, the additional signal is excluded, so that the signals can be received even if the additional signals are added in a manner such that the first number of subcarriers becomes equal to the second number of subcarriers.

Still another preferred embodiment of the present invention relates also to a radio apparatus. This apparatus comprises: a receiver which receives a plurality of combinations of control signal and data signal wherein the combination uses a plurality of subcarriers; a deinterleave unit which performs deinterleaving of a size defined by a first number of subcarriers on a control signal contained in a first combination and performs deinterleaving of a size defined by a second number of subcarriers on the remaining signals among the plurality of combinations received by the receiver; and an excluding unit which excludes an additional signal from a control signal contained in a second and the subsequent combination among the plurality of combinations deinterleaved by the deinterleave unit. The excluding unit excludes additional signals whose amount corresponds to a difference between the second number of subcarriers and the first number of subcarriers.

According to this embodiment, the additional signal is excluded, so that the signals can be received even if the additional signals are added in a manner such that the first number of subcarriers becomes equal to the second number of subcarriers.

Still another preferred embodiment of the present invention relates also to a radio apparatus. This apparatus comprises: an input unit which inputs a plurality of combinations of control signal and data signal wherein the combination uses a plurality of subcarriers; an interleave unit which performs interleaving of a size defined by a first number of subcarriers on a control signal and performs interleaving of a size defined by a second number of subcarriers on a data signal in the plurality of combinations inputted to the input unit; and an adding unit which adds an additional signal to a control signal in a plurality of combinations interleaved by the interleave unit. The adding unit adds additional signals whose amount corresponds to a difference between the second number of subcarriers and the first number of subcarriers.

According to this embodiment, the first number of subcarriers is made equal to the second number of subcarriers by appending additional signals, so that the variation in signal strength can be suppressed.

Still another preferred embodiment of the present invention relates also to a radio apparatus. This apparatus comprises: an input unit which inputs a plurality of combinations of control signal and data signal wherein the combination uses a plurality of subcarriers; an adding unit which adds an additional signal to a control signal in the plurality of combinations inputted to the input unit; and an interleave unit which performs interleaving of a size defined by a predetermined number of subcarriers in a plurality of combinations in which the additional signal has been added by the adding unit. The adding unit adds additional signals whose amount corresponds to a difference between the number of subcarriers corresponding to control signals other than the additional signal and the number of subcarriers corresponding to the data signal.

According to this embodiment, the first number of subcarriers is made equal to the second number of subcarriers by adding additional signals, so that the variation in signal strength can be suppressed.

Still another preferred embodiment of the present invention relates also to a radio apparatus. This apparatus comprises: a receiver which receives a plurality of combinations of control signal and data signal wherein the combination uses a plurality of subcarriers; an excluding unit which excludes an additional signal from a control signal in the plurality of combinations received by the receiver; and a deinterleave unit which performs deinterleaving of a size defined by a first number of subcarriers on a control signal and performs deinterleaving of a size defined by a second number of subcarriers on a data signal in the plurality of combinations in which the additional signal has been excluded by the excluding unit. The excluding unit excludes additional signals whose amount corresponds to a difference between the second number of subcarriers and the first number of subcarriers.

According to this embodiment, the additional signal is excluded, so that the signals can be received even if the additional signals are added in a manner such that the first number of subcarriers becomes equal to the second number of subcarriers.

Still another preferred embodiment of the present invention relates also to a radio apparatus. This apparatus comprises: a receiver which receives a plurality of combinations of control signal and data signal wherein the combination uses a plurality of subcarriers; a deinterleave unit which performs deinterleaving of a size defined by a predetermined number of subcarriers in the plurality of combinations received by the receiver; and an excluding unit which excludes an additional signal from a control signal in a plurality of combinations deinterleaved by the deinterleave unit. The excluding unit excludes additional signals whose amount corresponds to a difference between the number of subcarriers corresponding to the control signals other than the additional signal and the number of subcarriers corresponding to a data signal.

According to this embodiment, the additional signal is excluded, so that the signals can be received even if the additional signals are added in a manner such that the first number of subcarriers becomes equal to the second number of subcarriers.

Data may be composed of a plurality of streams. A known signal may be composed of a plurality of streams. A control signal may be composed of a plurality of streams.

It is to be noted that any arbitrary combination of the above-described structural components and the expressions changed among a method, an apparatus, a system, a recording medium, a computer program and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIGS. 9A and 9B illustrate packet formats according to a modification of the present invention;

FIGS. 10A to 10D illustrate packet formats in the communication system of FIG. 2;

FIGS. 11A and 11B illustrate another packet formats in the communication system of FIG. 2;

FIGS. 12A to 12C illustrate packet formats for training signals in the communication system of FIG. 2;

FIG. 18 illustrates a packet format of packet signal finally transmitted by the communication system of FIG. 2.

DETAILED DESCRIPTION OF THE INVENTION

The invention will now be described based on the following embodiments which do not intend to limit the scope of the present invention but exemplify the invention. All of the features and the combinations thereof described in the embodiments are not necessarily essential to the invention.

FIRST EMBODIMENT

An outline of the present invention will be given before a detailed description thereof. Embodiments of the present invention relate to a MIMO system comprised of at least two radio apparatuses. One of the radio apparatuses corresponds to a transmitting apparatus whereas the other thereof corresponds to a receiving apparatus. The transmitting apparatus generates one packet signal in such a manner as to contain a plurality of combinations of control signal and data signal. One packet signal is composed of a plurality of streams. As mentioned earlier, when the number of subcarriers necessary for transmitting a control signal differs from that of subcarriers necessary for transmitting a data signal, the strength of packet signals transmitted fluctuates. In the first embodiment, the following processing is executed to restrict the variation in the signal strength.

The transmitting apparatus performs interleaving of a size defined by the number of subcarriers corresponding to a control signal (hereinafter referred to as the "first number of first subcarriers") on the control signal. The transmitting apparatus performs interleaving of a size defined by the number of subcarriers corresponding to a data signal (hereinafter referred to as the "second number of first subcarriers") on the data signal. It is assumed here that the first number of subcarriers is "48" and the second number of subcarriers is "52". Of a plurality of combinations, the transmitting apparatus attaches additional signals to the control signals contained in the second and the subsequent combinations. Hereinafter, a control signal to which an additional signal is appended or control signals to which additional signals are appended will be referred to as a "control signal with an additional signal" or "control signals with their respective additional signals", respectively.

If the number of subcarriers corresponding to an additional signal is set to "4", the number of subcarriers used for a control signal with an additional signal" will be "52". Hence the number of subcarriers used for the control signal with the additional signal is now equal to the number of subcarriers used for a data signal. As a result, the variation in the signal strength is restricted. In a plurality of combinations, no additional signal is appended to a control signal contained in a combination in the beginning. This is because it is arranged that a radio apparatus in a communication system which is not compatible with a MIMO system (such a communication system will be hereinafter referred to as a "legacy system") can receive packet signals according to the first embodiment.

Figure 1:
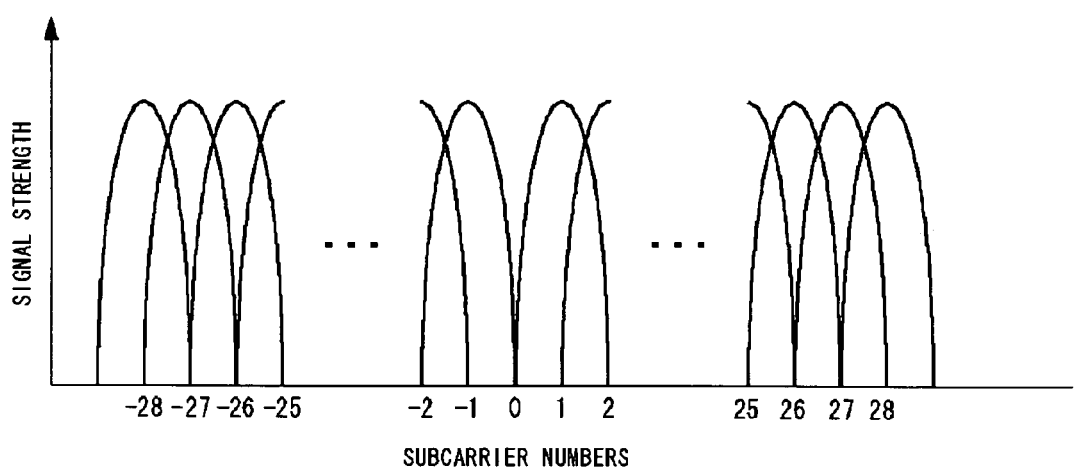
FIG. 1 illustrates a spectrum of a multicarrier signal according to a first embodiment of the present invention.

FIG. 1 illustrates a spectrum of a multicarrier signal according to an embodiment of the present invention. In particular, FIG. 1 shows a spectrum of a signal in the OFDM modulation scheme. One of a plurality of carriers in an OFDM modulation scheme is generally called a subcarrier. Herein, however, a subcarrier is designated by a "subcarrier number". In a MIMO system, 56 subcarriers, namely, subcarrier numbers "−28" to "28" are defined herein. It is to be noted that the subcarrier number "0" is set to null so as to reduce the effect of a direct current component in a baseband signal. On the other hand, in a legacy system, 52 subcarriers, namely, subcarrier numbers "−26" to "26" are defined. One example of legacy systems is a wireless LAN complying with the IEEE802.11a standard.

The respective subcarriers are modulated by a modulation scheme which is set variably. Used here is any of modulation schemes among BPSK (Binary Phase-Shift Keying), QPSK (Quadrature Phase-Shift Keying), 16-QAM (Quadrature Amplitude Modulation) and 64-QAM.

Convolutional coding is applied, as an error correction scheme, to these signals. The coding rates for the convolutional coding are set to ½, ¾ and so forth. The number of data to be transmitted in parallel is set variably. The data are transmitted as packet signals and each of packet signals to be transmitted in parallel is called "stream" herein. As a result thereof, since the mode of modulation scheme and the values of coding rate and the number of streams are set variably, the data rate is also set variably. It is to be noted that the "data rates" may be determined by arbitrary combination of these factors or by one of them. If the modulation scheme is BPSK and the coding rate is ½ in a legacy system, the data rate will be 6 Mbps. If, on the other hand, the modulation scheme is BPSK and the coding rate is ¾, the date rate will be 9 Mbps.

Figure 2:
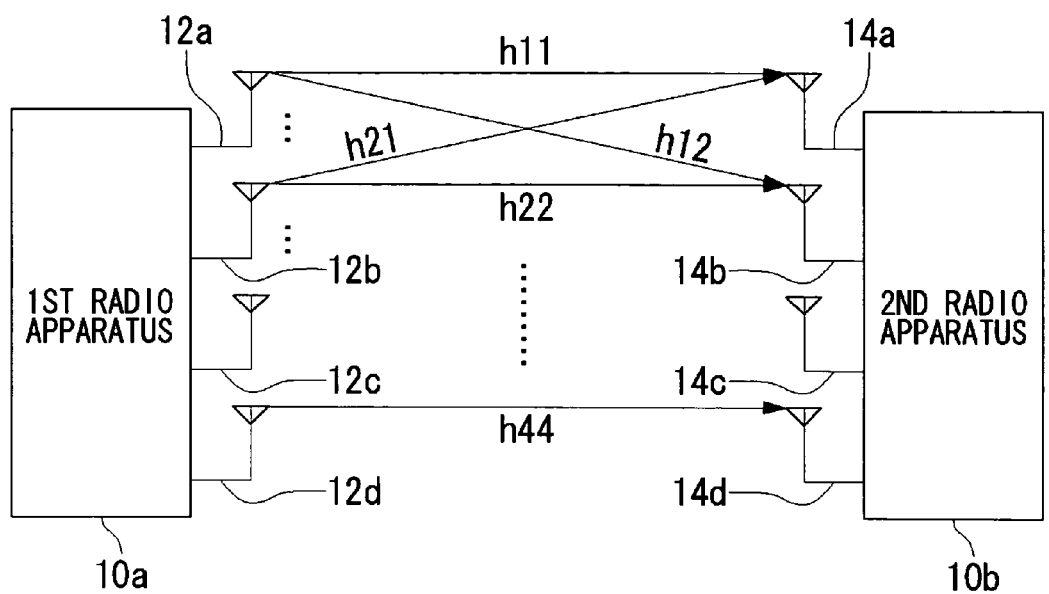
FIG. 2 illustrates a structure of a communication system according to a first embodiment of the present invention.

FIG. 2 illustrates a structure of a communication system 100 according to an embodiment of the present invention. The communication system 100 includes a first radio apparatus 10a and a second radio apparatus 10b, which are generically called "radio apparatus 10". The first radio apparatus 10a includes a first antenna 12a, a second antenna 12b, a third antenna 12c and a fourth antenna 12d, which are generically referred to as "antennas 12", and the second radio apparatus 10b includes a first antenna 14a, a second antenna 14b, a third antenna 14c and a fourth antenna 14d, which are generically referred to as "antennas 14". Here, the first radio apparatus 10a corresponds to a transmitting apparatus, whereas the second radio apparatus 10b corresponds to a receiving apparatus.

An outline of a MIMO system will be given before a description of a structure of the communication system 100. Assume herein that data are being transmitted from the first radio apparatus 10a to the second radio apparatus 10b. The first radio apparatus 10a transmits respectively data of a plurality of streams from the first antenna 12a to fourth antenna 12d, respectively. As a result, the data rate becomes higher. The second radio apparatus 10b receives the data of a plurality of streams by the first antenna 14a to fourth antenna 14d. The second radio apparatus 10b separates the received signals by adaptive array signal processing and demodulates independently the data of a plurality of streams.

Since the number of antennas 12 is "4" and the number of antennas 14 is also "4" here, the number of combinations of channels between the antennas 12 and the antennas 14 is "16". The channel characteristic between from the ith antenna 12i to the jth antenna 14j is denoted by $h_{ij}$. In FIG. 2, the channel characteristic between the first antenna 12a and the first antenna 14a is denoted by $h_{11}$, that between from the first antenna 12a to the second antenna 14b by $h_{12}$, that between the second antenna 12b and the first antenna 14a by $h_{21}$, that between from the second antenna 12b to the second antenna 14b by $h_{22}$, and that between from the fourth antenna 12d to the fourth antenna 14d by $h_{44}$. For the clarity of illustration, it is omitted to show the other channels in FIG. 2.

Figure 3:
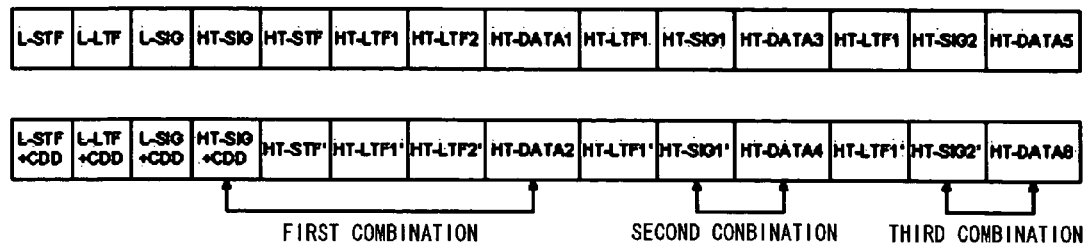
FIG. 3 illustrates packet formats in the communication system shown in FIG. 2.

FIG. 3 illustrates packet formats in a communication system 100. For the simplicity of explanation, it is assumed here that the number of streams contained in the packet formats is "2". The stream transmitted from the first antenna 12a is shown in the top row whereas the stream transmitted from the second antenna 12b is shown in the bottom row. In the top row of FIG. 3, "L-STF", "L-LTF", "L-SIG" and "HT-SIG" correspond to a known signal for timing estimation, a known signal for channel estimation, a control signal compatible with a legacy system, and a control signal compatible with a MIMO system, respectively. In the bottom row of FIG. 3, "L-STF+ CDD", "L-LTF+CDD", "L-SIG+CDD" and "HT-SIG+ CDD" correspond to the results obtained when CDD (Cyclic Delay Diversity) is implemented to "L-STF", "L-LTF", "L-SIG" and "HT-SIG", respectively. That is, "L-STF+ CDD" is such that "L-STF" has undergone the cyclic timing shifting.

"HT-STF" and "HT-STF'" correspond to known signals, for timing estimation, compatible with a MIMO system, and they are so defined as to use different subcarriers from each other. "HT-LTF1", "HT-LTF1'", "HT-LTF2" and "HT-LTF2'" correspond to known signals, for channel characteristics, compatible with a MIMO system. "HT-LTF1" and "HT-LTF1'" are so defined as to use different subcarriers from each other. The same applies to "HT-LTF2" and "HT-LTF2'". On the other hand, "HT-LTF2" is so defined as to use the subcarriers that have not been used in "HT-LTF1". "HT-DATA1" and "HT-DATA2" are data signals. The control signals for "HT-DATA1" and "HT-DATA2" correspond to "HT-SIG" and "HT-SIG+CDD", respectively. Accordingly, a set of "HT-SIG", "HT-SIG+CDD", "HT-DATA1" and "HT-DATA2" is called a "first combination".

"HT-SIG1" and "HT-SIG1'" are control signals for "HT-DATA3" and "HT-DATA4" which are assigned posterior to the "HT-SIG1" and "HT-SIG1'", respectively. "HT-SIG1" and "HT-SIG1'" are so defined as to use subcarriers different from each other. "HT-DATA3" and "HT-DATA4" are data signals. A set of "HT-SIG1" and "HT-SIG1'", "HT-DATA3" and "HT-DATA4" is called a "second combination". The same holds for "HT-SIG2" and "HT-SIG2'", "HT-DATA5" and "HT-DATA6", and a set of them is called a "third combination".

The portions from the beginning up to "HT-SIG" and "HT-SIG+CDD" use "52" subcarriers in the same way as in a legacy system. Of "52" subcarriers, "4" subcarriers correspond to the pilot signals. On the other hand, the portions corresponding to "HT-STF" and "HT-STF'" use "24" subcarriers in the total of a plurality of streams. The portions corresponding to "HT-LTF1", "HT-LTF1'", "HT-SIG1", "HT-SIG1'" and so forth use "56" subcarriers in the total of a plurality of streams. The portions corresponding to "HT-DATA1", "HT-DATA2" and so forth use "56" subcarriers. The control signals in "HT-SIG1" and the like correspond to the aforementioned control signals with their respective additional signals.

"HT-SIG" and the like are demodulated based on "L-LTF". The both use the same number of carriers, namely "52", and a processing for adjusting to the power at a posterior part of "56" subcarriers is carried out. On the other hand, "HT-SIG1" and the like are demodulated based on "HT-LTF1" and the like. If "HT-SIG1" and the like use "52" subcarriers in the same way as in "HT-SIG" and the like, the number of subcarriers used does not agree with the number of subcarriers, namely, "56", used in "HT-LTF1" and the like, so that the powers at the both parts do not coincide. Thus, according to the present invention, the number of subcarriers used in "HT-SIG" and the like is extended to "56" as was explained above.

Figure 4:
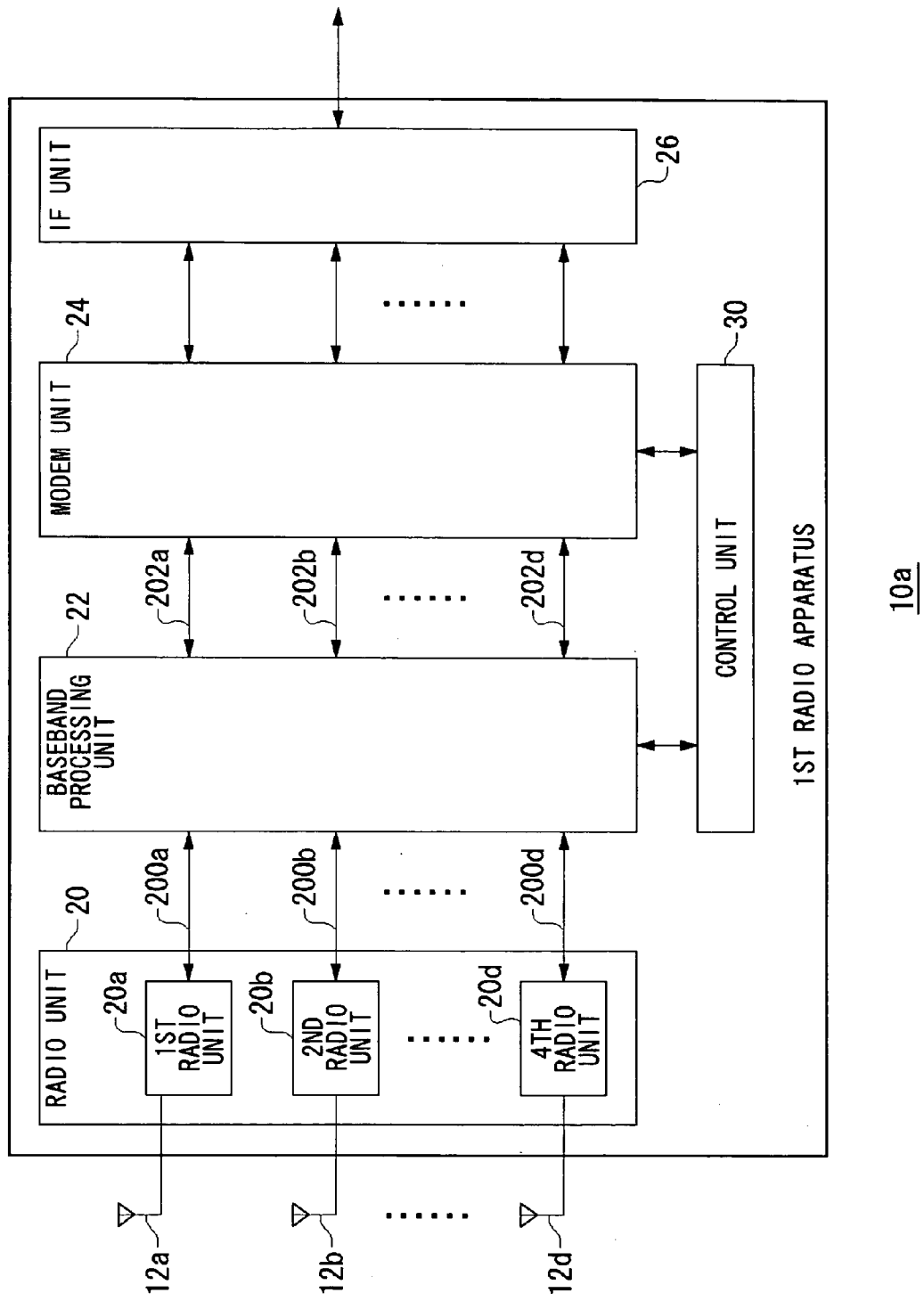
FIG. 4 illustrates a structure of a first radio apparatus shown in FIG. 2.

FIG. 4 illustrates a structure of a first radio apparatus 10a. The first radio apparatus 10a includes a first radio unit 20a, a second radio unit 20b, . . . and a fourth radio unit 20d, which are generically referred to as "radio unit 20", a baseband processing unit 22, a modem unit 24, an IF unit 26 and a control unit 30. Signals involved include a first time-domain signal 200a, a second time-domain signal 200b, . . . and a fourth time-domain signal 200d, which are generically referred to as "time-domain signal 200", and a first frequency-domain signal 202a, a second frequency-domain signal 202b, a third frequency-domain signal 202c and a fourth frequency-domain signal 202d, which are generically referred to as "frequency-domain signal 202". The second radio apparatus 10b has a structure similar to that of the first radio apparatus 10a.

As a receiving operation, the radio unit 20 carries out frequency conversion of radiofrequency signal received by the antennas 12 so as to derive baseband signals. The radio unit 20 outputs the baseband signals to the baseband processing unit 22 as the time-domain signals 200. The baseband signal, which is composed of in-phase components and quadrature components, shall generally be transmitted by two signal lines. For the clarity of figure, the baseband signal is presented here by a single signal line only. An AGC unit and an A-D conversion unit are also included.

As a transmission operation, the radio unit 20 carries out frequency conversion of baseband signals from the baseband processing unit 22 so as to derive radiofrequency signals. Here, the baseband signal from the baseband processing unit 22 is also indicated as the time-domain signal 200. The radio unit 20 outputs the radiofrequency signals to the antennas 12. A PA (power amplifier) and a D-A conversion unit are also included. It is assumed herein that the time-domain signal 200 is a multicarrier signal converted to the time domain and is a digital signal.

As a receiving operation, the baseband processing unit 22 converts a plurality of time-domain signals 200 respectively into the frequency domain and performs adaptive array signal processing on the thus converted frequency-domain signals. Then the baseband processing unit 22 outputs the result of adaptive array signal processing as the frequency-domain signals 202. One frequency-domain signal 202 corresponds to data contained in each of a plurality of streams transmitted from the second radio apparatus 10b, not shown here. As a transmission operation, the baseband processing unit 22 inputs, from the modem unit 24, the frequency-domain signals 202 serving as signals in the frequency domain, converts the frequency-domain signals into time domain and then outputs the thus converted signals as time-domain signals 200 by associating them respectively with a plurality of antennas 12.

It is assumed that the number of antennas 12 to be used in the transmission processing is specified by the control unit 30. It is assumed herein that the frequency-domain signal 202, which is a signal in the frequency domain, contains a plurality of subcarrier components as shown in FIG. 1. For the clarity of figure, the frequency-domain signal is arranged in the order of the subcarrier numbers, and forms serial signals.

Figure 5:
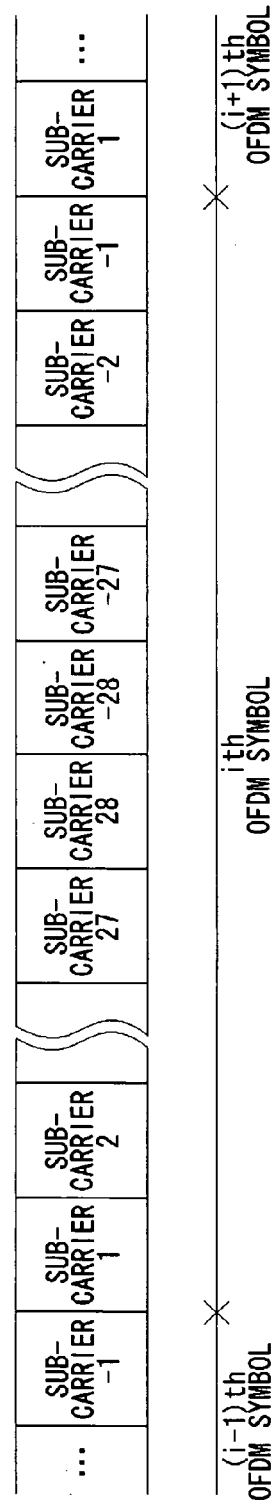
FIG. 5 illustrates a structure of a frequency-domain signal shown in FIG. 4.

FIG. 5 illustrates a structure of a frequency-domain signal. Assume herein that a combination of subcarrier numbers "−28" to "28" shown in FIG. 1 constitutes an "OFDM symbol". An "i"th OFDM symbol is such that subcarrier components are arranged in the order of subcarrier numbers "1" to "28" and subcarrier numbers "−28" to "−1". Assume also that an "(i−1)"th OFDM symbol is placed before the "i"th OFDM symbol, and an "(i+1)"th OFDM symbol is placed after the "i"th OFDM symbol. It is to be noted here that in the portions such as "L-STF" shown in FIG. 3 a combination of from the subcarrier number "−26" to the subcarrier number "−26" is used.

Now refer back to FIG. 4. To produce the packet format corresponding to FIG. 3, the baseband processing unit 22 carries out CDD. CDD is expressed as a matrix C in the following Equation (1).

$$C(\lambda)=\mathrm{diag}(1,\exp(-j2\pi\lambda\delta/Nout),\Lambda,\exp(-j2\pi\lambda\delta(Nout-1)/Nout)) \quad (1)$$

where δ indicates a shift amount and λ a subcarrier number. The multiplication of the matrix C by a stream is done on a subcarrier-by-subcarrier basis. That is, the baseband processing 22 carries out a cyclic time shifting within the LTF and so forth per stream. The shift amount is set to a different value for each stream.

As a receiving processing, the modem unit 24 demodulates and deinterleaves the frequency-domain signal 202 outputted from the baseband processing unit 22. The demodulation is carried out per subcarrier. The modem unit 24 outputs the demodulated signal to the IF unit 26. As a transmission processing, the modem unit 24 carries out interleaving and modulation. In so doing, the modem unit 24 generates a control signal with an additional signal by appending an additional signal to a control signal. The modem unit 24 outputs the modulated signal to the baseband processing unit 22 as a frequency-domain signal 202. When the transmission processing is carried out, the modulation scheme is specified by the control unit 30.

As a receiving processing, the IF unit 26 combines signals outputted from a plurality of modem units 24 and then forms one data stream. The IF unit 26 decodes the one data stream. The IF unit 26 outputs the decoded data stream. As a transmission processing, the IF unit 26 inputs one data stream, then codes it and, thereafter, separates the coded data stream. Then the IF unit 26 outputs the thus separated data to the plurality of modem units 24. When the transmission processing is carried out, the coding rate is specified by the control unit 30. The control unit 30 controls the timing and the like of the first radio apparatus 10a.

In terms of hardware, this structure can be realized by a CPU, a memory and other LSIs of an arbitrary computer. In terms of software, it is realized by memory-loaded programs which have communication functions and the like, but drawn and described herein are function blocks that are realized in cooperation with those. Thus, it is understood by those skilled in the art that these function blocks can be realized in a variety of forms such as by hardware only, software only or the combination thereof.

Figure 6:
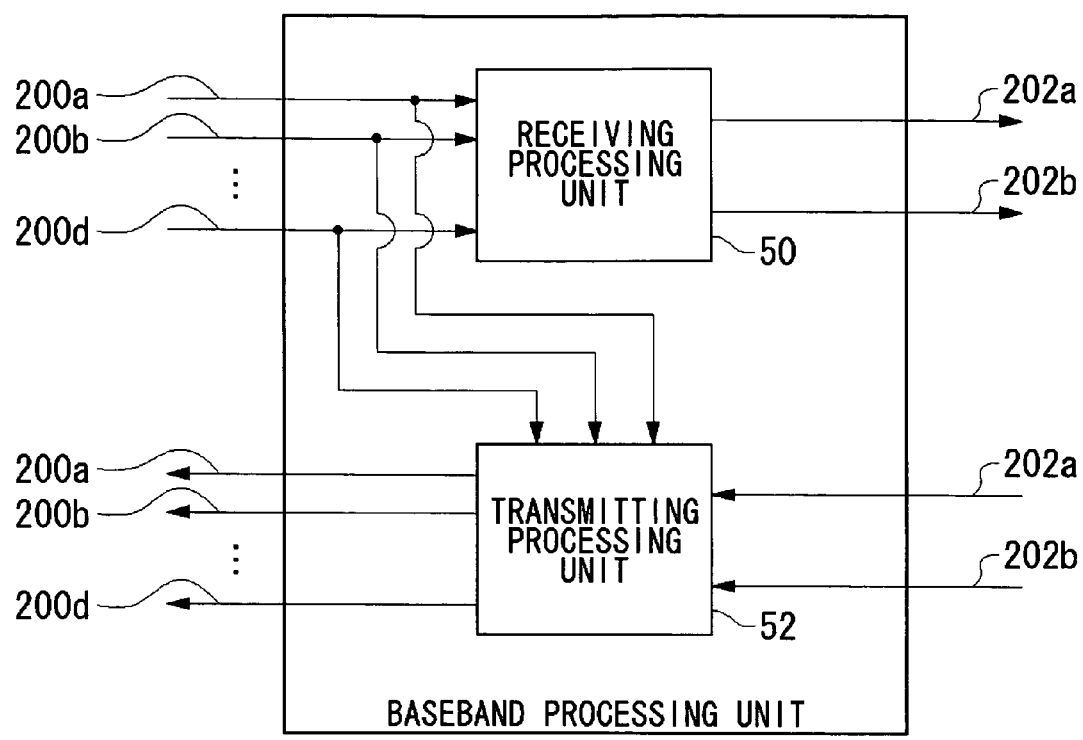
FIG. 6 illustrates a structure of a baseband processing unit shown in FIG. 4.

FIG. 6 illustrates a structure of a baseband processing unit 22. The baseband processing unit 22 includes a processing unit for use with receiving 50 and a processing unit for use with transmission 52. The receiving processing unit 50 executes a part, corresponding to a receiving operation, of operations by the baseband processing unit 22. That is, the receiving processing unit 50 performs adaptive array signal processing on time-domain signals 200 and therefore derives receiving weight vectors. Then the receiving processing unit 50 outputs the result of array synthesis as the frequency-domain signal 202.

A processing of receiving processing unit 50 will now be described in a specific manner. The receiving processing unit 50 inputs a plurality of time-domain signals 200 and then performs Fourier transform on them, respectively, so as to derive frequency-domain signals. As described earlier, a frequency-domain signal is such that signals corresponding to subcarriers are arranged serially in the order of subcarrier numbers.

The receiving processing unit 50 weights the frequency-domain signals with receiving weight vectors, and a plurality of weighted signals are added up. Since the frequency-domain signal is composed of a plurality of subcarriers, the above processing is also executed on a subcarrier-by-subcarrier basis. As a result, the signals summed up are also arranged serially, as shown in FIG. 5, in the order of subcarrier numbers. The signals summed up are the aforementioned frequency-domain signals 202.

The receiving processing unit 50 derives receiving weight vectors by use of an adaptive algorithm, for example, LMS algorithm. Alternatively, receiving response vectors are derived by correlation processing and then the receiving weight vectors may be derived from the receiving response vectors. Here, the latter case will be described. If a frequency-domain signal corresponding to the first time-domain signal 200a is denoted by $x_1(t)$, a frequency-domain signal corresponding to the second time-domain signal 200b by $x_2(t)$, a reference signal in the first stream by $S_1(t)$ and a reference signal in the second stream by $S_2(t)$, then $x_1(t)$ and $x_2(t)$ will be expressed by the following Equation (2):

$$x_1(t) = h_{11}S_1(t) + h_{21}S_2(t) \qquad (2)$$
$$x_2(t) = h_{12}S_1(t) + h_{22}S_2(t)$$

The noise is ignored here. A first correlation matrix $R_1$, with E as an ensemble average, is expressed by the following Equation (3):

$$R_1 = \begin{bmatrix} E[x_1 S_1^*] & E[x_1 S_2^*] \\ E[x_2 S_1^*] & E[x_2 S_2^*] \end{bmatrix} \qquad (3)$$

A second correlation matrix $R_2$ among the reference signals is given by the following Equation (4).

$$R_2 = \begin{bmatrix} E[S_1 S_1^*] & E[S_1 S_2^*] \\ E[S_2 S_1^*] & E[S_2 S_2^*] \end{bmatrix} \qquad (4)$$

Finally, the first correlation matrix $R_1$ is multiplied by the inverse matrix of the second correlation matrix $R_2$ so as to derive a receiving response vector, which is expressed by the following Equation (5).

$$\begin{bmatrix} h_{11} & h_{21} \\ h_{12} & h_{22} \end{bmatrix} = R_1 R_2^{-1} \qquad (5)$$

Then the receiving processing unit 50 computes a receiving weight vector from the receiving response vector.

It is to be noted that the receiving processing unit 50 computes plural kinds of receiving weight vectors. A first kind of receiving weight vector is a receiving weight vector to receive HT-SIG and the like, and is derived from L-LTF and the like. A second kind of receiving weight vector is a receiving weight vector to receive HT-DATA1 and the like and is derived from HT-LTF1, HT-LTF2 and the like. A third kind of receiving weight vector is a receiving weight vector to receive HT-SIG1 and the like and is derived from HT-LTF1 and the like. Using such plural kinds of receiving weight vectors as above, the receiving processing unit 50 carries out array synthesis. Under such a condition, the modem unit 24 provided at a stage subsequent to the baseband processing unit 22 carries out demodulation using the pilot signals.

The transmitting processing unit 52 executes a part, corresponding to a transmission operation, of operations by the baseband processing unit 22. The transmitting processing unit 52 may perform beamforming or eigenmode transmission. Any known technique may be used for these and therefore the description thereof is omitted here.

Figure 7:
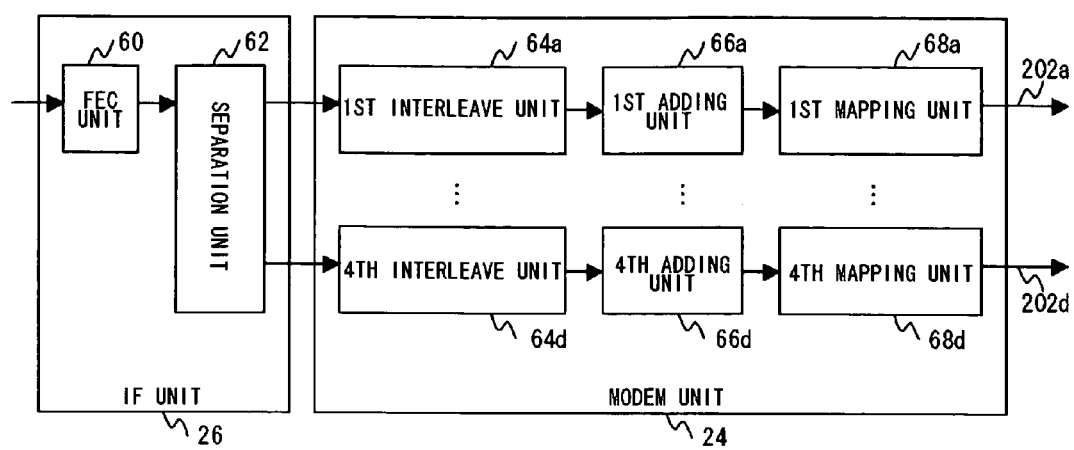
FIG. 7 illustrates a structure of IF unit and modem unit shown in FIG. 4.

FIG. 7 illustrates a structure of IF unit 26 and modem unit 24. Shown here is a portion concerning the transmission function in the IF unit 26 and the modem unit 24. The IF unit 26 includes an FEC (Forward Error-Correcting) unit 60 and a separation unit 62. The modem unit 24 includes a first interleave unit 64a ... and a fourth interleave unit 64d, which are generically referred to as "interleave unit 64", a first adding unit 66a ... and a fourth adding unit 66d, which are generically referred to as "adding unit 66", and a first mapping unit 68a ... and a fourth mapping unit 68d, which are generically referred to as "mapping unit 68".

A plurality of combinations of control signal and data signal, which are to use a plurality of subcarriers, are inputted to the FEC unit 60. The combinations meant here are equal to the "first combination" to the "third combination" as shown in FIG. 3. The control signal corresponds to "HT-SIG", "HT-SIG1" and the like in FIG. 3. The FEC unit 60 performs coding on each of the plurality of combinations. Note that the coding rate may be set for the control signal and the data signal independently of each other.

The separation unit 62 partitions and separates a signal inputted from the FEC unit 60 into a plurality of streams. The interleave unit 64 carries out an interleaving of a size defined by the first number of subcarriers, namely, 48, on the control signal, and carries out an interleaving of a size defined by the second number of subcarriers, namely, 52, on the data signal. Here, the amount of data contained in the size defined by the number of subcarriers "52" is changed by the modulation scheme or the like used by the modem unit 24. It is assumed that the interleaving pattern is predetermined.

The adding unit 66 adds additional signals to control signals contained in the second and subsequent combinations of the plurality of combinations interleaved by the interleaving unit 64. As a result, control signals with their respective additional signals are generated. Here the control signals contained in the second and subsequent combinations correspond to "HT-SIG1", "HT-SIG1'", "HT-SIG2" and "HT-SIG2'" shown in FIG. 3. It is to be noted that the amount of additional signal to be added by the adding unit 66 is determined by the difference of the second number of subcarriers from the first number of subcarriers. In other words, the amount of additional signal is determined by the difference "4" between the second number of subcarriers and the first number of subcarriers and the modulation scheme. As a result of the processing as described above, the number of subcarriers used by control signals with their respective additional signals becomes the same as the number of subcarriers used by the data signals. It is to be understood here that the additional signal is a dummy signal.

The mapping unit 68 performs mappings of BPSK, QPSK, 16-QAM and 64-QAM on the signals from the adding unit 66. Mapping, which is a known technology, is not explained here. The mapping unit 68 outputs a mapped signal as a frequency-domain signal 202. The insertion of known signals, such as "L-STF" as shown in FIG. 3, or the insertion of pilot signals is done by the modem unit 24.

On the other hand, the receiving function for receiving the packet signals generated as described above performs operation opposite to that explained above. That is, the modem unit 24 receives an input of frequency-domain signals 202. The frequency domain signal 202, which is a combination of control signal and data signal, is equal to a combination using a plurality of subcarriers. Here the control signals contained in the second and subsequent combinations correspond to control signals with their respective additional signals. The excluding unit (not shown) in the modem unit 24 excludes additional signals from the control signals with their respective additional signals contained in the second and subsequent combinations out of a plurality of combinations. In other words, the excluding unit outputs control signals and data signals by excluding the dummy signals therefrom. Note that the excluding unit excludes additional signals according to the difference between the second number of subcarriers and the first number of subcarriers.

A deinterleave unit (not shown) in the modem unit 24 performs a deinterleaving of a size defined by the first number of subcarriers, namely, 48, on the control signal, of the plurality of combinations with the additional signals excluded, and performs a deinterleaving of a size defined by the second number of subcarriers, namely, 52, on the data signal.

In the description thus far, an additional signal is added to an interleaved control signal. In this condition, the number of subcarriers used for "HT-LTS1" and the like is equal to the number of subcarriers used for a control signal with additional signal. In other words, the variation in the number of subcarriers and the variation in the signal strength of packet signals are subject to restriction. On the other hand, the size of interleaving, when based on the number of subcarriers, is different between the control signal with an additional signal and the data signal. As a result, a switching in the size of interleaving is done between the two. A modification to be described later aims to restrict the change in size to be used in the interleaving.

Figure 8:
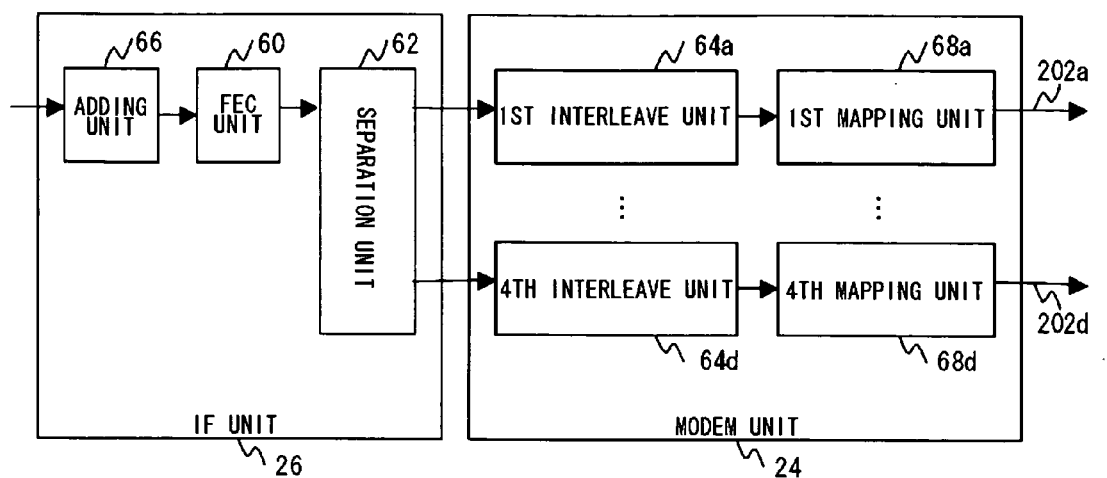
FIG. 8 illustrates another structure of IF unit and modem unit shown in FIG. 4.

FIG. 8 illustrates another structure of IF unit 26 and modem unit 24. Shown here is a portion concerning the transmission function in the IF unit 26 and the modem unit 24. The IF unit 26 includes an adding unit 66, an FEC (Forward Error-Correcting) unit 60 and a separation unit 62. The modem unit 24 includes a first interleave unit 64*a* . . . and a fourth interleave unit 64*d*, which are generically referred to as "interleave unit 64", and a first mapping unit 68*a* . . . and a fourth mapping unit 68*d*, which are generically referred to as "mapping unit 68". The components having the function equivalent to those in FIG. 7 are given the same reference numerals and therefore their repeated explanation will be omitted as appropriate. Compared with the above structure, the arrangement of the adding unit 66 differs from that in FIG. 7.

A plurality of combinations, of control signal and data signals, which are to use a plurality of subcarriers are inputted to the adding unit 66. The adding unit 66 appends additional signals to the control signal contained in the second combination and the subsequent combinations in a plurality of combinations. Accordingly, control signals with their respective additional signals are produced. Here, the amount of additional signals appended by the adding unit 66 is determined according to the difference between the first number of subcarriers and the second number of subcarriers. It is assumed herein that the additional signals are for use with CRC (Cyclic Redundancy Check). The signals for CRC are generated by the FEC unit 60. As a result, the bit number used for CRC increases and therefore the data error characteristics improves. The additional signal may be a signal for use with parity check.

The interleave unit 64 carries out an interleaving of a size defined by the first number of subcarriers on the control signal contained in the first combination, and carries out an interleaving of a size defined by the second number of subcarriers on the remaining signals. That is, the number of interleave size switching can be reduced.

On the other hand, the receiving function of receiving the packet signals thus generated executes an operation opposite to the operation in the above description. That is, the modem unit 24 inputs the frequency-domain signals 202. The frequency-domain signal corresponds to a combination, of control signal and data signal, which uses a plurality of subcarriers. Here, control signals contained in the second combination and the subsequent combinations are control signals with their respective additional signals.

A deinterlieave unit (not shown) in the modem unit 24 performs a deinterleaving of a size defined by the first number of subcarriers on control signals contained in the first combination among a plurality of combinations, and performs a deinterleaving of a size defined by the second number of subcarriers on the remaining signals.

The excluding unit (not shown) in the modem unit 24 excludes additional signals from the control signals with their respective additional signals contained in the second and subsequent combinations out of a plurality of combinations. That is, the excluding unit outputs control signals and data signals by excluding the signals for CRC. Note that the excluding unit excludes additional signals according to the difference between the second number of subcarriers and the first number of subcarriers. The IF unit 26 executes the detection by CRC.

A modification will be explained hereinbelow. In this modification, an additional signal is added to a control signal in the same way as in the first embodiment. However, the packet format in the modification differs from that in the first embodiment. In the first embodiment, a plurality of combinations are included in a packet signal. In the modification, however, it may be such that only one combination is included in a single packet signal. A control signal is placed between known signals for use with channel estimation. Accordingly, the control signal is demodulated based on the known signal for use with channel estimation. At this time, if there is a difference between the number of subcarriers used for the control signal and the number of subcarriers used for the known signal for channel estimation, the same problem as mentioned earlier will arise. Hence, in the modification, too, an additional signal is added to a control signal as mentioned above (hereinbelow, such a control signal is also referred to as a "control signal with an additional signal").

The structure of a radio apparatus 10 according to the modification is of the same type as that of the first radio apparatus 10*a* of FIG. 4, whereas the structures of an IF unit 26 and a modem unit 24 thereof are of the same type as those of the IF unit 26 and the modem unit 24 of FIG. 7. Thus the repeated explanation thereof is omitted here. It is to be noted that the radio apparatus 10 generates a packet signal, with control signals placed in the intermediate intervals, which is to use a plurality of subcarriers, and transmits the packet signal thus generated. It is so defined that the number of subcarriers necessary for transmitting a control signal is smaller than that of subcarriers used in a known signal for channel estimation, which is placed in the preceding interval.

In the modification, an adding unit 66 adds an additional signal to a control signal so that the number of subcarriers to be used in the control signal becomes equal to that of subcarriers used in the known signal for channel estimation. Here, the additional signal is to be a pilot signal, namely, a known signal. By the processing as described above, the aforementioned problem is solved in the modification in a similar manner as in the first embodiment.

FIGS. 9A and 9B illustrate packet formats according to a modification of the present invention. FIG. 9A shows the first packet format according to the modification. Here, data contained in four streams are to be transmitted, and the packet formats corresponding to the first to fourth streams are shown in order from the top to the bottom level. In a packet signal corresponding to the first stream, "L-STF", "HT-LTF" and the like are assigned as preamble signals. In a packet signal corresponding to the second stream, "L-STF-400 ns", "HT-LTF-400 ns" and the like are assigned as preamble signals. In a packet signal corresponding to the third stream, "L-STF-200 ns", "HT-LTF-200 ns" and the like are assigned as preamble signals. And in a packet signal corresponding to the fourth stream, "L-STF-600 ns", "HT-LTF-600 ns" and the like are assigned as preamble signals.

Here, "400 ns" and the like represent the amounts of shift by CDD. Note that "HT-SIG" in the packet formats is equivalent to a control signal. The HT-LTF in the first stream is placed in the order of "HT-LTF", "–HT-LTF", "HT-LFT" and "–HT-LTF" from the top. Here these are called the "first component", the "second component", the "third component" and the "fourth component" in order in all the streams. A desired signal for the first stream is extracted at the receiving apparatus by carrying out an operation of "first component minus (–) second component plus (+) third component minus (–) fourth component" for the received signals of all the streams.

By performing an operation of "first component+second component+third component+fourth component" for the received signals of all the streams, desired signals for the second stream are extracted at the receiving apparatus. By performing an operation of "first component–second component–third component+fourth component" for the received signals of all the streams, desired signals for the third stream are extracted at the receiving apparatus. By performing an operation of "first component+second component–third component–fourth component" for the received signals of all the streams, desired signals for the fourth stream are extracted at the receiving apparatus. It is to be noted that the additions and subtractions are done by the vector operation.

The number of subcarriers used for "HT-LTF" and the like is "56". As for "HT-SIG", the number of subcarriers necessary for transmitting a control signal is "52". Hence, if the number of subcarriers used for "HT-SIG" is "52", then the "HT-SIG" will have a smaller number of subcarriers than that used in the preceding interval. As a result, the same problem as in the embodiment arises as mentioned above. Accordingly, the adding unit 66 adds a pilot signal composed of 4 subcarriers to "HT-SIG". This makes the number of subcarriers used for "HT-SIG" "56", thus making the number of subcarriers equal to that in the preceding interval. Here the reason why the number of subcarriers necessary for transmitting a control signal, which is an "HT-SIG", is "52" will be explained by referring to FIG. 9B.

FIG. 9B shows the second packet format according to the modification. Referring to FIG. 9B, "L-LTF" and "L-SIG" are assigned posterior to "L-STF", in the first stream. "HT-SIG" is assigned posterior to the "L-SIG". "HT-STF", "HT-LTF" and so forth are assigned posterior to the "HT-SIG", on the other hand, the CDD with the shift amounts of "50 ns", "100 ns" and "150 ns" is implemented in "L-STF", "L-LTF" and "L-SIG" in the second stream to fourth stream, respectively. Similar to FIG. 9A, the CDD with the shift amounts of "400 ns", "200 ns" and "600 ns" is implemented in "HT-SIGs" in the second stream to fourth stream, respectively.

Placed following the above signals are "HT-STF", "HT-LTF" and the like. Here "L-STF", "L-LTF" and "L-SIG" are signals placed therein to retain compatibility with legacy systems. Accordingly, the number of subcarriers used in "L-LTF" and "L-SIG" is "52" in the same manner as in the legacy system. Thus, the number of subcarriers used in "HT-SIG", which follows these, is also "52". It is to be noted that "56" subcarriers are used in "HT-STF", "HT-LTF" and the like in order to realize a high transmission rate in a MIMO system.

In order to simplify the processing for the packet formats as shown in FIGS. 9A and 9B, there is a demand that the same interleave unit and the same deinterleave unit be placed in the radio apparatus 10 and the processing be done on "HT-SIG" which has the same information bit arrangement. Normally, however, the number of subcarriers for "HT-SIG" in FIG. 9A is necessarily "52" in accordance with the number of subcarriers for "HT-SIG" in FIG. 9B. And this gives rise to a power variation in the case of FIG. 9A. According to the present invention, however, the addition of an additional signal compensates for the power variation while meeting the aforementioned demand.

Here, any of the packet formats shown in FIGS. 9A and 9B may be used. The packet formats of FIG. 9A, with fewer redundant signal components, can improve the utilization efficiency. On the other hand, the packet formats of FIG. 9B, for which preamble signals compatible with the legacy system are added, allow detection by communication apparatuses compatible with the legacy system. The adding unit 66 adds pilot signals when the packet format of FIG. 9B is used, and does not add pilot signals when the packet format of FIG. 9A is used. That is, the adding unit 66 stops adding additional signals when a packet signal is generated in such a manner that the number of subcarriers necessary for a control signal is the same as that used in the preceding interval.

Hereinbelow, a description will be given of a processing carried out by the radio apparatus 10 when the packet formats shown in FIGS. 9A and 9B are received. The baseband processing unit 22 identifies the format of a received packet format. In the packet format shown in FIG. 9A (hereinafter referred to as "first format"), additional signals are attached to the control signal whose number of subcarriers required therefor is smaller than the number of subcarriers used in an early interval so that the number of subcarriers required becomes identical to that of subcarriers used in the early interval. In the packet format shown in FIG. 9B (hereinafter referred to as "second format"), on the other hand, the number of subcarriers required therefor is identical to that of subcarriers used in an early interval. Whether a received packet signal is the first packet or the second packet is identified in the baseband processing unit 22.

More specifically, the baseband processing unit 22 estimates the channel characteristics based on L-LTF, using a known technique. The shift amount for CDD is defined in the range of "200 ns" to "600 ns" in the first format, whereas it is defined in the rage of "50 ns" to "150 ns" in the second format. Accordingly, in the estimated channel characteristic the delay time of delayed waves in the first format is longer than that in the second format. The baseband processing unit 22 identifies the packet format by comparing the delay time of delayed waves with a threshold value. For instance, if the delay time of delayed waves is greater than the threshold value, it will be identified that the packet format is the first format.

The baseband processing unit 22 and the modem unit 24 process the packet signals in accordance with the identified format of a packet signal. When the packet format is the first format, the baseband processing unit 22 and the modem unit 24 exclude the additional signals from the control signals with additional signals. Then a processing similar to the above processing will be performed on the control signals. If the additional signal is the pilot signal, the modem unit 24 will correct the phase based on the pilot signal. When, on the other hand, the packet format is the second format, the baseband processing unit 22 and the modem unit 24 do not exclude the additional signals. Then a processing similar to that carried out in the case of the first format will be executed.

According to the first embodiment, the number of subcarriers used in a data signal is made equal to the number of subcarriers used in a control signal with additional signals by attaching additional signals to the control signal which is inserted among data signals. Thus, the variation in signal strength can be suppressed and controlled. And because of this controlled variation in signal strength, the time constant of AGC at the receiving apparatus can be made longer. Also, because of this controlled variation in signal strength, the dynamic range at the receiving apparatus can be made smaller. In addition, the receiving characteristics thereof can be improved. Moreover, since drops in signal strength in the course of a packet signal can be avoided, any transmission from a third party communication apparatus multiplexed by CSMA can be prevented. And since any transmission from a third party communication apparatus multiplexed by CSMA can be prevented, the probability of signal collisions can be lowered. Furthermore, since a dummy signal is added as an additional signal, complexity of processing can be reduced. Since a receiving apparatus, once additional signals are removed from control signals with additional signals, can perform normal functions, additional processing can be reduced.

The number of subcarriers used for data signals and the number of subcarriers used for control signals with additional signals are made equal to each other by adding an additional signal to each control signal inserted between data signals before interleaving. Thus, the number of interleave size switching can be reduced. And variation in signal strength can be suppressed and controlled while reducing the number of interleave size switching. Since a signal for CRC is added as an additional signal, the receiving characteristics can be improved.

Furthermore, since the number of subcarriers used for known signals for channel estimation and the number of subcarriers used for control signals with additional signals are made equal to each other by adding an additional signal to each control signal inserted between known signals for channel estimation, variation in signal strength can be suppressed and controlled. And since a pilot signal is added as an additional signal, the receiving characteristics at a receiving apparatus can be improved. And the addition of pilot signals only helps reduce the complexity of processing. Since the addition of an additional signal is stopped when a packet signal is generated such that the number of subcarriers necessary for a control signal is the same as that used in the preceding interval, it is possible to adjust the number of subcarriers in such a manner as to suit the packet format.

Since the variation in signal strength can be suppressed, the time constant of AGC at the receiving apparatus can be made longer. Since the variation in signal strength can be suppressed, the dynamic range at the receiving apparatus can be made smaller. In addition, the receiving characteristics thereof can be improved. Moreover, since drops in signal strength in the course of a packet signal can be avoided, any transmission from a third party communication apparatus multiplexed by CSMA can be prevented. And since any transmission from a third party communication apparatus multiplexed by CSMA can be prevented, the probability of signal collisions can be lowered. Furthermore, since a dummy signal is attached as an additional signal, the complexity of processing can be reduced. The receiving apparatus can perform normal functions if the additional signals are removed from control signals with additional signals, so that additional processing can be reduced.

Whether a received packet signal is a packet format where a control signal with an additional signal is assigned or a packet format where a control signal is assigned is identified, and a processing is executed according to the identified result. Hence, the packet signals can be received independently of whether the additional signals are attached or not. Since the number of subcarriers used for a known signal is made equal to that of subcarriers used for a control signal irrespective of whether the additional signals are attached or not, the deterioration of receiving qualities can be prevented. Since the packet format can be identified automatically, a plurality of packet formats can be accommodated even without any other signal attached thereto. When the additional signal is a pilot signal, said pilot signal can be used to correct the phase. Thus, the receiving characteristics can be improved. Since the processing of excluding the additional signals is added, the increase in processing amount due to the addition can be suppressed.

SECOND EMBODIMENT

A problem to be solved by a second embodiment of the present invention will be stated as follows. Varying the number of antennas to be used for data communication in a MIMO system enables adjusting a data rate, too. The data rate can be adjusted in greater detail by use of an adaptive modulation. To perform such an adjustment of data rates more reliably it is desired that a transmitting apparatus acquire from a receiving apparatus the information on data rates suited for a radio channel between the transmitting apparatus and the receiving apparatus (hereinafter referred to as "rate information"). TO enhance the accuracy of such rate information, it is desirable that the receiving apparatus acquire the channel characteristics between a plurality of antennas contained in the transmitting apparatus and those contained in the receiving apparatus, respectively.

Examples of the combinations of directivity patterns in the antennas of the transmitting apparatus and receiving apparatus in a MIMO system are as follows. One example is a case where the antennas of a transmitting apparatus have omni patterns and the antennas of a receiving apparatus have patterns in adaptive array signal processing. Another example is a case where both the antennas of the transmitting apparatus and those of the receiving apparatus have patterns in adaptive array signal processing. This is also called the beamforming. The system can be simplified in the former case. In the latter case, however, the directivity patterns of antennas can be controlled in greater detail, so that the characteristics thereof can be improved. Since in the latter case the transmitting apparatus performs adaptive array signal processing for transmission, it is necessary to receive beforehand from the receiving apparatus the known signals by which to estimate channels.

To improve the accuracy of rate information and the accuracy of beamforming in the above-mentioned requirements, it is necessary that the channel characteristics be acquired with high accuracy. To improve the accuracy in the acquisition of channel characteristics, it is desirable that the channel characteristics between a plurality of antennas contained in the transmitting apparatus and those in the receiving apparatus be acquired respectively. For this reason, the transmitting apparatus or the receiving apparatus transmits from all of antennas the known signals for use in channel estimation. Hereinafter, the known signals, for use in channel estimation, transmitted from a plurality of antennas will be referred to as "training signals" independently of the number of antennas to be used for data communication.

Under these circumstances, the inventor of the present invention came to recognize the following problems to be solved. When the training signals are transmitted, the number of streams containing known signals for use in channel estimation (hereinafter referred to as "channel estimation known signals") differs from that containing data. A known signal for setting AGC (Automatic Gain Control), hereinafter referred to as "AGC known signal", at the receiving side is assigned anterior to the channel estimation known signals. When an AGC known signal is assigned only in a stream where data is assigned, one of the channel estimation known signals is received in a state where the AGC known signal has not been received anterior thereto. In particular, when the strength of AGC known signal doesn't get larger at the receiving side, the gain of AGC is set to a value which is large to a certain degree. In so doing, when the strength of channel estimation known signal of a stream where the AGC known signal is not assigned is larger, there is a strong possibility that said channel estimation known signal may be amplified to such a degree that distortion is caused by AGC. As a result thereof, the error in channel estimation based on said channel estimation known signal becomes larger.

On the other hand, when an AGC known signal is assigned in a stream where a channel estimation known signal is assigned, the number of streams in which the AGC known signal is assigned differs from that in which data is assigned. Hence, there is a possibility that the gain set by the AGC known signal is not suitable for the demodulation of data. AS a result, the demodulated data are subject to errors. The present invention has been made under such circumstances and a general purpose thereof is to provide a radio apparatus that prevents the degradation in receiving characteristics when transmitting known signals for use in channel estimation.

An outline of the present invention will be given before a detailed description thereof. Embodiments of the present invention relate to a MIMO system comprised of at least two radio apparatuses. One of the radio apparatuses corresponds to a transmitting apparatus whereas the other thereof corresponds to a receiving apparatus. The transmitting apparatus generates one packet signal composed of a plurality of streams. In particular, a description will be given here of a processing performed when the transmitting apparatus transmits training signals. Any known technique may be used for the adaptive modulation processing using the aforementioned rate information and the beamforming and therefore the repeated explanation will be omitted here.

The transmitting apparatus assigns to a header portion of a packet signal a known signal for use in channel estimation in a legacy system (hereinafter referred to as "legacy known signal"), and assigns a control signal, a channel estimation known signal and a data signal to positions posterior to the legacy known signal. Since the number of subcarriers used for a MIMO system is greater than that used for a legacy system, the number of subcarriers used for the channel estimation known signal and data signal is greater than that used for conventional known signal. On the other hand, to improve the transmission efficiency of packet signals it is desirable that the length of known signals contained in a packet signal be shorter. Accordingly, the legacy known signal is used as part of the channel estimation known signal. Subcarrier parts running short in the legacy known signals, among the channel estimation known signals, are contained in the control signal.

When the training signals are produced from the packet signals defined by the packet format as above, the number of subcarriers runs short if the legacy known signals are also used for sub-streams. Thus, the required channel estimation cannot be carried out. As a result, there is a possibility that the estimation of channel characteristics will be degraded. Also, since the number of streams to which the AGC known signals are assigned differs from that to which the channel estimation known signals are assigned, there is a possibility that the error in estimation of channel characteristics in the receiving apparatus will deteriorate. For these reasons, the following processing will be carried out in the second embodiment.

A transmitting apparatus according to the second embodiment separates a channel known signal into a part of streams where data signals are assigned and a part of streams where no data signal is assigned. Here, part corresponding to a stream where data signals are assigned (hereinafter referred to as "main stream") is called a first known signal, whereas part corresponding to a stream where no data signal is assigned (hereinafter referred to as "sub-stream") will be called a second known signal. The transmitting apparatus assigns signals in the order of an AGC known signal, a legacy known signal, a control signal, a first known signal, a second known signal and a data signal. In other words, the transmitting apparatus sets, in a main stream, a blank period after the first known signal and sets a data signal after the bland period. Here, the blank period corresponds to a period in which the second known signal is assigned in a sub-stream.

As described earlier, for a main stream, a known component for channel estimation is composed of a first known signal and a component assigned in part of subcarriers of a control signal. On the other hand, the number of subcarriers used in the second known signal is so defined as to equal that used in the data signal. Accordingly, even when the control signal is not assigned to a sub-stream, the use of only the second known signal makes it possible to estimate the channel characteristics for the sub-stream.

It is assumed herein that training signals are transmitted from the first radio apparatus 10a to the second radio apparatus 10b of FIG. 2.

FIGS. 10A to 10D show packet formats for a communication system 100. The packet formats shown in the in FIGS. 10A to 10D are not the formats of training signals but those of ordinary packet signals. FIG. 10A represents a case where the number of streams is "4", and FIG. 10B a case where the number of streams is "2". FIG. 10C has the same format as FIG. 10A, and shows a case where the timing shift amounts are represented by "Ans", "Bns" and "Cns". FIG. 10D has the same format as FIG. 10B, and shows a case where the timing shift amount is represented by "Ans". In FIG. 10A, it is assumed that data contained in four streams are to be transmitted, and packet formats corresponding to the first to fourth streams are shown in order from top row to bottom row. In the packet signal corresponding to the first stream, "L-STF", "HT-LTF" and the like are assigned as preamble signals.

"L-STF", "L-LTF", "L-SIG", "HT-SIG1" and "HT-SIG2" are a known signal for AGC setting, a known signal for channel estimation and a control signal compatible with a legacy system, and a control signal compatible with a MIMO system, respectively. "HT-SIG1" and "HT-SIG2" will be generically referred to as "HG-SIG". The control signal compatible with a MIMO system, for example, has information on the number of streams included therein. "HT-STF" and "HT-LTF" are a known signal for AGC setting and a known signal for channel estimation for a MIMO system, respectively. On the other hand, "Data 1" is a data signal. Note that L-LTF and HT-LTF are used not only for AGC setting but also for timing setting.

In the packet signal corresponding to the second stream, "L-STF(−50 ns)", "HT-LTF(−400 ns)" and the like are assigned as preamble signals. In the packet signal corresponding to the third stream, "L-STF(−100 ns)", "HT-LTF(−200 ns)" and the like are assigned as preamble signals. In the packet signal corresponding to the fourth stream, "L-STF(−150 ns)", "HT-LTF(−600 ns)" and the like are assigned as preamble signals.

Here, "−400 ns" and the like indicate the amounts of timing shift in CDD. The CDD is a processing where in a predetermined interval a time-domain waveform is shifted, by a shift amount, in a posterior direction and then the waveform pushed out from the rearmost part in the predetermined interval is assigned cyclically in a header portion of the predetermined interval. In other words, "L-STF(−400 ns)" is "L-STF" given a cyclic timing shift by a delay of −400 ns. Assume that L-STF and HT-STF is each composed of a repetition of an 800 ns duration and that the other HT-LTF and the like are each constituted by a repetition of a 3.2 μs duration. It is also to be noted that "Data 1" to "Data 4" are also subjected to CDD and the amounts of timing shift are of the same values as those for HT-LTFs assigned anterior thereto.

In the first stream, HT-LTFs are assigned in the order of "HT-LTF", "−HT-LTF", "HT-LTF" and "−HT-LTF" from the top. Here, these in this order are called "a first component", "a second component", "a third component" and "a fourth component" in all the streams. A receiving apparatus extracts a desired signal for the first stream by computing "first component minus (−) second component plus (+) third component minus (−) fourth component" for received signals of all the streams. The receiving apparatus extracts a desired signal for the second stream by computing "first component+second component+third component+fourth component" for received signals of all the streams. The receiving apparatus extracts a desired signal for the third stream by computing "first component−second component−third component+fourth component" for received signals of all the streams. The receiving apparatus extracts a desired signal for the fourth stream by computing "first component+second component−third component−fourth component" for received signals of all the streams. Note that the addition and subtraction processing is done by vector operation.

As with a legacy system, "52" subcarriers are used for the part from "L-LTF" to "HT-SIG1" and so forth. Note that "4" subcarriers out of the "52" subcarriers correspond to pilot signals. On the other hand, the part of "HT-LTF" or the like and thereafter uses "56" subcarriers.

FIG. 10B is similar to the first stream and second stream of the packet formats shown in FIG. 10A. Here, the assignment of "HT-LTFs" in FIG. 10B differs from that of "HT-LTFs" in FIG. 10A. That is, there are only the first components and the second components of HT-LTFs. In the first stream, HT-LTFs are assigned in the order of "HT-LTF" and "HT-LTF" from the top. A receiving apparatus extracts a desired signal for the first stream by computing "first component+second component" for received signals of all the streams. Also, the receiving apparatus extracts a desired signal for the second stream by computing "first component−second component" for received signals of all the streams.

FIGS. 11A and 11B show another packet formats for a communication system 100. The packet formats shown in the in FIGS. 11A and 11B correspond to those for improving the transmission efficiency in the packet formats in FIGS. 10A and 10B. Hereinafter, those for improving the transmission efficiency in the packet formats in FIGS. 10A and 10B will be referred to as "short formats", and in association with this "short format" the packet formats as shown in FIGS. 10A and 10B will be called "long formats". In other words, those shown in FIGS. 11A and 11B are such that part of "HT-STF" are shared with "L-STF" and "L-STF" is used as a substitute for "HT-LTF". As a result, the length of known signal is made shorter than that in the case of FIGS. 10A and 10B. FIG. 11A shows a short format over FIG. 10A. Comparing FIG. 11A with FIG. 10A, the header portions and HT-STFs are removed in FIG. 11A from among the four "HT-LTFs" and so forth in each of stream shown in FIG. 10A.

In FIG. 11A, "L-LTF" is used as a header portion of the four "HT-LTFs" and so forth. Here, as described above, "HT-LTF" uses 56 subcarriers. That is, the subcarriers corresponding to the subcarrier numbers "−28" to "28" shown in FIG. 1 are used. On the other hand, "L-LTF" uses 52 subcarriers as described above. That is, the subcarriers corresponding to the subcarrier numbers "−26" to "26" shown in FIG. 1 are used. Note that the values at subcarriers corresponding to the subcarriers numbers "−26" to "26" are common to both "HT-LTF" and "L-LTF". Accordingly, when "L-LTF" is used as a substitute for "HT-LTF", values corresponding to the subcarriers numbers "−28", "−27", "27" and "28" are missing.

In order to cope with this, in FIG. 11A the subcarriers corresponding to the subcarrier numbers "−28", "−27", "27" and "28" are added for "L-SIG" and then the values corresponding to those of "HT-LFT" are assigned to the added subcarriers. As a result, if "HT-LTF" is counted as one unit, the one unit will be also constructed by "L-LTF" and part of "L-SIG'".

FIG. 11B shows a short format associated with FIG. 10B. Comparing FIG. 11B with FIG. 10B, the header portions and HT-LTFs are removed in FIG. 11B from among the two "HT-LTFs" and so forth in each of stream shown in FIG. 10B. Now, since the header portion of FIG. 11B is constructed similarly to FIG. 11A, the repeated description will be omitted here.

Figures 12A, 12B, 12C:
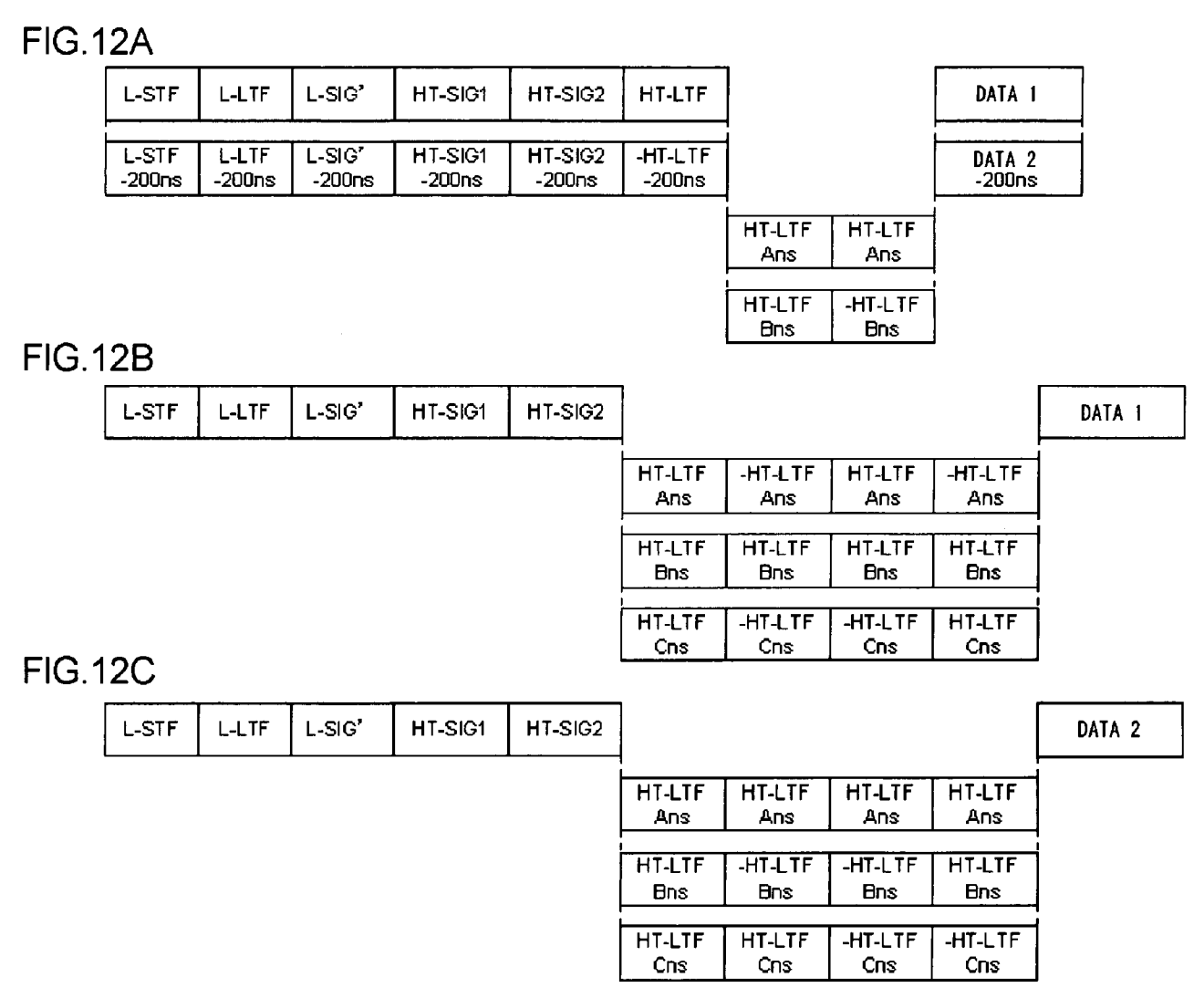

FIGS. 12A to 12C show packet formats for use with training signals in a communication system 100. Note that FIGS. 12A to 12C show training signals corresponding to short formats. FIG. 12A represents a case where the number of streams to which a data signal is assigned is "2", and FIGS. 12B and 12C a case where the number of streams to which a data signal is assigned is "1". That is, a data signal is assigned to each of the first stream and the second stream in FIG. 12A, whereas a data signal is assigned to the first stream in FIGS. 12B and 12C. The assignment up to HT-LTF in the first stream and the second stream in FIG. 12A is the same as that of FIG. 11B. In a position posterior thereto, however, a blank duration is provided in the first stream and the second stream. In the third and fourth streams, on the other hand, HT-LTFs are assigned to the position corresponding to the blank duration in the first and second streams. Following the HT-LTFs assigned in the third and fourth streams, Data are assigned to the first and second streams.

The assignment as described above makes the number of streams to which "HT-STF" is assigned equal to the number of main streams, so that the error contained in the gain set by "L-STF" becomes small at a receiving apparatus, thus preventing the worsening of data signal receiving characteristics. Also, since the "HT-STFs" assigned to the third and fourth streams are only assigned to these two streams, the error contained in the gain set by "L-STF" becomes small at a receiving apparatus, thus preventing a drop in the accuracy of channel estimation.

In the first stream and second stream, namely, in the main stream, the structure of known signals for channel estimation is the same as that shown in FIG. 11B. "L-LTF", part of "L-SIG'" and "HT-LTF" form known signal for channel estimation. In the third stream and fourth stream, namely, in the sub-stream, the structure of known signals for channel estimation is the same as that shown in FIG. 10B. The sub-stream is formed by one stream composed of "HT-LTF" and HT-LTF" and the other stream composed of "HT-LTF" and "−HT-LTF". In the main stream the channel efficiency is enhanced by use of short formats and, at the same time, in the substream a channel characteristic corresponding to the substream can be derived by use of "HT-LTF" constituted by "56" subcarriers.

Note that the amounts of timing shift for the third and fourth stream shown in FIG. 12A are represented by "Ans" and "Bns", respectively. Here it is assumed that the degrees of priority for the amounts of timing shift are defined in the descending order of "0 ns", "−200 ns", "−100 ns" and "100 ns". In other words, "0 ns" has the highest degree of priority, and "100 ns" the lowest. Here, for each of the main stream and the sub-stream, the amounts of timing shift are used in descending degree of priority. Accordingly, the values of "0 ns" and "−200 ns" are used as timing shift amounts in the first stream and the second stream, respectively. In such a case, the values of "0 ns" and "−200 ns" are also used as timing shift amounts, respectively, in the third stream and the fourth stream, so that "Ans" becomes "0 ns" and "Bns" becomes "−200 ns". As a result, when "HT-LTF" in the first stream and "−HT-LTF" (−200 ns) in the second stream are deformed and modified, the thus deformed and modified fields are also used in the third and fourth streams, thus making the processing simpler.

Different amounts of timing shifts may also be set respectively to the amounts of timing shift for a plurality of streams. The timing shift amount of "0 ns" is set for the first stream. The timing shift amount "−200 ns" is set for the second stream. The timing shift amount of "−100 ns" is set for the third stream. The timing shift amount of "−100 ns" is set for the fourth stream. Accordingly, the timing shift amounts of "−100 ns" and "100 ns" are used in the third stream and the fourth stream, respectively, instead of the above-described timing shift amounts of "0 ns" and "−200 ns" in the third stream and the fourth stream, respectively. And "Ans" is substituted by "−100" and "Bns" is substituted by "100 ns".

The structure of a known signal for channel estimation in the first stream, namely, the main stream in FIG. 12B is the same as that described so far. Since the main stream is composed of a single stream, a single "HT-LTF" only should be contained in the main stream. As described above, one "HT-LTF" is substituted by part of "L-SIG'" and "L-LTF", so that "HT-LTF" is not contained in the main stream of FIG. 12B. In a position posterior to "HT-SIG" of the first stream, a blank duration is provided in the first stream. In the second to fourth streams, on the other hand, HT-LTFs are assigned to the positions corresponding to the blank duration in the first stream. And, following the HT-LTFs assigned in the second to fourth streams, Data is assigned to the first stream.

Here it is assumed that the degrees of priority are given to the combinations of sign of "HT-LFT". That is, the combination of signs in the first stream has the highest degree of priority, and the combination of signs in the fourth stream has the lowest degree of priority. For the main stream, the combination of signs is used in descending degree of priority and at the same time, for the sub-streams, the combination of signs is used in descending degree of priority. In this manner, the combinations of signs for the main stream and the sub-stream are set identical to each other. As a result, when the receiving apparatus carries out the operation of plus (+) and minus (−) and then retrieves each component, the same common circuit can be used for both the calculation of channel characteristics for "HT-LTF" in the main stream and that for "HT-LTF" in the sub-stream.

The packet format of FIG. 12C is structured the same way as for that of FIG. 12B. However, the combination of the signs of "HT-LTF" in FIG. 12C differs from that in FIG. 12B. Here the combination of signs of "HT-LTF" is so defined that an orthogonal relationship holds among the streams. Furthermore, in FIG. 12C, the combination of the signs of "HT-LTF" is so defined as to be fixed for each of a plurality of streams. Note that the amounts of timing shift in FIG. 12B and FIG. 12C are represented by "Ans", "Bns" and "Cns". The values therefor were described above and the description thereof is omitted here.

Figure 13:
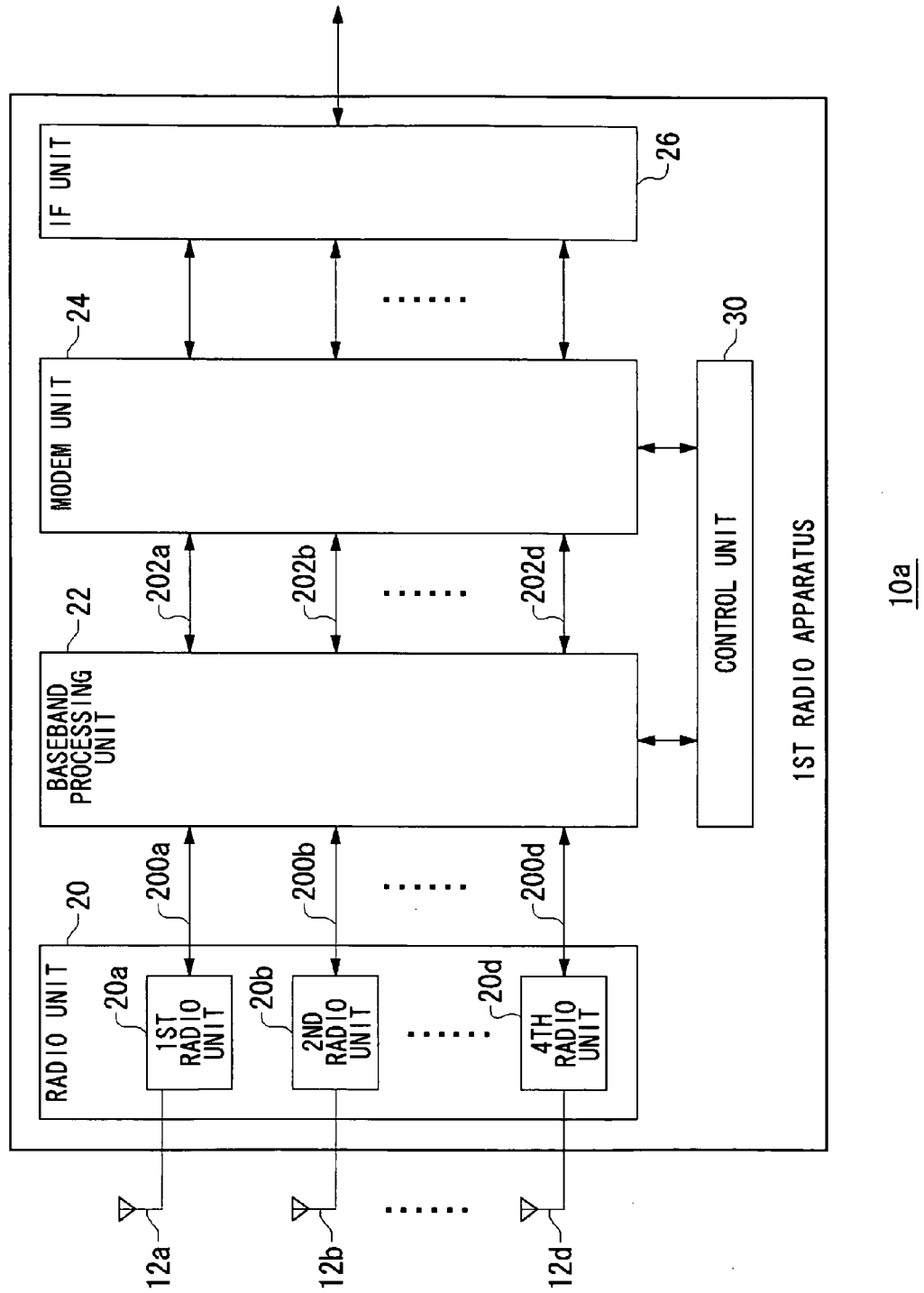
FIG. 13 illustrates a structure of a first radio apparatus shown in FIG. 2.

FIG. 13 illustrates a structure of a first radio apparatus 10a. The first radio apparatus 10a includes a first radio unit 20a, a second radio unit 20b, . . . and a fourth radio unit 20d, which are generically referred to as "radio unit 20", a baseband processing unit 22, a modem unit 24, an IF unit 26 and a control unit 30. Signals involved include a first time-domain signal 200a, a second time-domain signal 200b, . . . and a fourth time-domain signal 200d, which are generically referred to as "time-domain signal 200", and a first frequency-domain signal 202a, a second frequency-domain signal 202b, a third frequency-domain signal 202c and a fourth frequency-domain signal 202d, which are generically referred to as "frequency-domain signal 202". The second radio apparatus 10b has a structure similar to that of the first radio apparatus 10a. Accordingly, in the following description, the description on the receiving operation corresponds to the processing by the second radio apparatus 10b, whereas the description on the transmission operation corresponds to the processing by the first radio apparatus 10a. This correspondence may be reversed, too.

As a receiving operation, the radio unit 20 carries out frequency conversion of radiofrequency signal received by the antennas 12 so as to derive baseband signals. The radio unit 20 outputs the baseband signals to the baseband processing unit 22 as the time-domain signals 200. The baseband signal, which is composed of in-phase components and quadrature components, shall generally be transmitted by two signal lines. For the clarity of figure, the baseband signal is presented here by a single signal line only. An AGC unit and an A-D conversion unit are also included. The AGC unit sets the gain in "L-STF" and "HT-STF".

As a transmission operation, the radio unit 20 carries out frequency conversion of baseband signals from the baseband processing unit 22 so as to derive radiofrequency signals. Here, the baseband signal from the baseband processing unit 22 is also indicated as the time-domain signal 200. The radio unit 20 outputs the radiofrequency signals to the antennas 12. That is, the radio unit 20 transmits radio-frequency packet signals from the antennas 12. A PA (power amplifier) and a D-A conversion unit are also included. It is assumed herein that the time-domain signal 200 is a multicarrier signal converted to the time domain and is a digital signal.

As a receiving operation, the baseband processing unit 22 converts a plurality of time-domain signals 200 respectively into the frequency domain and performs adaptive array signal processing on the thus converted frequency-domain signals. Then the baseband processing unit 22 outputs the result of adaptive array signal processing as the frequency-domain signals 202. One frequency-domain signal 202 corresponds to data contained in each of a plurality of streams transmitted from the second radio apparatus 10b, not shown here. As a transmission operation, the baseband processing unit 22 inputs, from the modem unit 24, the frequency-domain signals 202 serving as signals in the frequency domain, converts the frequency-domain signals into time domain and then outputs the thus converted signals as time-domain signals 200 by associating them respectively with a plurality of antennas 12.

It is assumed that the number of antennas 12 to be used in the transmission processing is specified by the control unit 30. It is assumed herein that the frequency-domain signal 202, which is a signal in the frequency domain, contains a plurality of subcarrier components as shown in FIG. 1. For the clarity of figure, the frequency-domain signal is arranged in the order of the subcarrier numbers, and forms serial signals.

Figure 14:
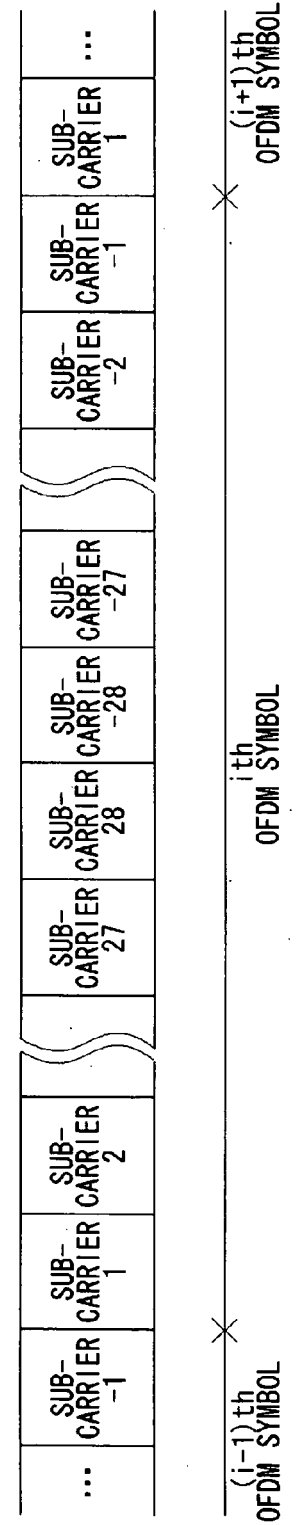
FIG. 14 illustrates a structure of a frequency-domain signal shown in FIG. 1.

FIG. 14 illustrates a structure of a frequency-domain signal. Assume herein that a combination of subcarrier numbers "−28" to "28" shown in FIG. 1 constitutes a so-called "OFDM symbol". An "i"th OFDM symbol is such that subcarrier components are arranged in the order of subcarrier numbers "1" to "28" and subcarrier numbers "−28" to "−1". Assume also that an "(i−1)"th OFDM symbol is placed before the "i"th OFDM symbol, and an "(i+1)"th OFDM symbol is placed after the "i"th OFDM symbol. It is to be noted here that, in the portions such as "L-SIG" shown in FIG. 10A or the like, a combination of from the subcarrier number "−26" to the subcarrier number "−26" is used.

Now refer back to FIG. 13. To produce the packet formats corresponding to FIGS. 10A and 10B, FIGS. 11A and 11B and FIGS. 12A to 12C, the baseband processing unit 22 carries out CDD. The baseband processing unit 22 may perform the multiplication of a steering matrix to deform or modify the packet format produced. Such processing will be discussed later.

As a receiving processing, the modem unit 24 demodulates and deinterleaves the frequency-domain signal 202 outputted from the baseband processing unit 22. The demodulation is carried out per subcarrier. The modem unit 24 outputs the demodulated signal to the IF unit 26. As a transmission processing, the modem unit 24 carries out interleaving and modulation. The modem unit 24 outputs the modulated signal to the baseband processing unit 22 as a frequency-domain signal 202. When the transmission processing is carried out, the modulation scheme is specified by the control unit 30.

As a receiving processing, the IF unit 26 combines signals outputted from a plurality of modem units 24 and then forms one data stream. The IF unit 26 decodes the one data stream. The IF unit 26 outputs the decoded data stream. As a transmission processing, the IF unit 26 inputs one data stream, then codes it and, thereafter, separates the coded data stream. Then the IF unit 26 outputs the thus separated data to the plurality of modem units 24. When the transmission processing is carried out, the coding rate is specified by the control unit 30. Here, an example of the coding is convolutional coding, whereas an example of decoding is Viterbi decoding.

The control unit 30 controls the timing and the like of the first radio apparatus 10a. The control unit 30 produces packet signals composed of a plurality of streams as shown in FIGS. 10A and 10B and FIGS. 12A to 12C in cooperation with the IF unit 26, the modem unit 24 and the baseband processing unit 22. Though the description of the processing for generating the packet signals shown in FIGS. 10A and 10B and FIGS. 11A and 11B is omitted here, it is preferred that the relevant part of the processing corresponding to that for generating the packet signals shown in FIGS. 12A to 12C be executed.

For the baseband processing unit 22, the control unit 30 assigns Data to at least one main stream in a plurality of streams, and assigns HT-LTF to a position anterior to the Data in the main stream. This corresponds to the arrangement in the first main stream and second main stream shown in FIG. 12A. When the main stream is composed of a single stream, HT-LTF is not assigned therein. Accordingly, L-LTF and L-SIG' are assigned anterior to Data. For the sub-streams, the control unit 30 assigns HT-LTFs to the timings other than those at which the respective signals in the main stream are assigned. This corresponds to the arrangement in the third sub-stream and fourth sub-stream shown in FIG. 12A. As a result of the above, the baseband processing unit 22 produces the packet signals of the packet format shown in FIG. 12A.

The control unit 30 so defines that the number of subcarriers in one of known signals assigned to the main stream, namely, L-LTF is smaller than the number of subcarriers in Data. As described above, the number of subcarriers for L-LTF is defined to be "52", whereas the number of subcarriers for Data is defined to be "56". The known components corresponding to the subcarriers not contained in L-LTF among a plurality of subcarriers which are to constitute Data is so defined as to be contained in L-SIG'. Accordingly, of "56" subcarriers that constitute HT-LTF, the components equivalent to "52" subcarriers are assigned to L-LTF and those equivalent to "4" subcarriers are assigned to L-SIG'. Thus, L-SIG' is composed of "56" subcarriers, too. On the other hand, the control unit 30 so defines that the number of subcarriers in HT-LTF in the sub-stream is made equal to the number of subcarriers in Data.

Further explanation from a different perspective will now be given of the above processing. The control unit 30 defines short formats as shown in FIGS. 11A and 11B and long formats as shown in FIGS. 10C and 10D. The control unit 30 uses L-LTF, L-SIG' and HT-LTF defined by the short formats as shown in FIGS. 11A and 11B to transmit the known components in the main streams. And the control unit 30 uses HT-LFT defined by the long formats as shown in FIGS. 10C and 10D to transmit the known components in the sub-streams.

For the baseband processing unit 22, the control unit 30 applies CDD to HT-LTF and the like assigned to the main stream. Where one stream serves as a reference, the CDD is equivalent to applying a cyclic shifting within HT-LFT to HT-LFT assigned to the other streams. The control unit 30 applies CDD also to HT-LTF assigned to sub-streams. The control unit 30 sets, in advance, degrees of priority for the amounts of timing shift. As described above, here the amount of timing shift "0 ns" is given the maximum degree of priority, and following this the degree of priority is so set that it decreases in the order of "−200 ns", "−100 ns" and "100 ns".

For the main streams, the control unit 30 has the baseband processing unit 22 use the amounts of timing shift sequentially in order from that having a high degree of priority. For example, referring to FIG. 12A, "0 ns" is used for the first stream and "−200 ns" is used for the second stream. For the sub-streams, too, the control unit 30 has the baseband processing unit 22 use the amounts of timing shift sequentially from that having the high degree of priority. For example, referring to FIG. 12A, "0 ns" is used for the third stream and "−200 ns" is used for the fourth stream. The control unit 30 also has the baseband processing unit apply CDD to Data and has it use the timing shift amounts for the main streams. It is to be noted that the control unit 30 may set different amounts of timing shift to a plurality of streams, respectively. In the case of FIG. 12A, for example, "0 ns" is used for the first stream, "−200 ns" is used for the second stream, "−100 ns" is used for the third stream, and "100 ns" is sued for the fourth stream.

By the above processing, after the generation of packet formats as shown in FIGS. 12A to 12C, the control unit 30 may have the baseband processing unit 22 deform or modify the packet signals such as these and then transmit the deformed or modified packet signals to the radio unit 20. The baseband processing unit 22 extends the number of main streams to the number of a plurality of streams, and then applies CDD to the extended stream. The baseband processing unit 22 also extends the number of sub-streams to the number of a plurality of streams, and then applies CDD to the extended stream. Here, the control unit 30 sets the amounts of timing shift in a manner that the absolute value of a timing shift amount when the packet signals shown in FIGS. 12A to 12C are generated is larger than the absolute value of a timing shift amount when the packet signals shown in FIGS. 12A and 12B are deformed.

In terms of hardware, this structure described as above can be realized by a CPU, a memory and other LSIs of an arbitrary computer. In terms of software, it can be realized by memory-loaded programs which have communication functions and the like, but drawn and described herein are function blocks that are realized in cooperation with those. Hence, it is understood by those skilled in the art that these function blocks can be realized in a variety of forms such as by hardware only, software only or the combination thereof.

Figure 15:
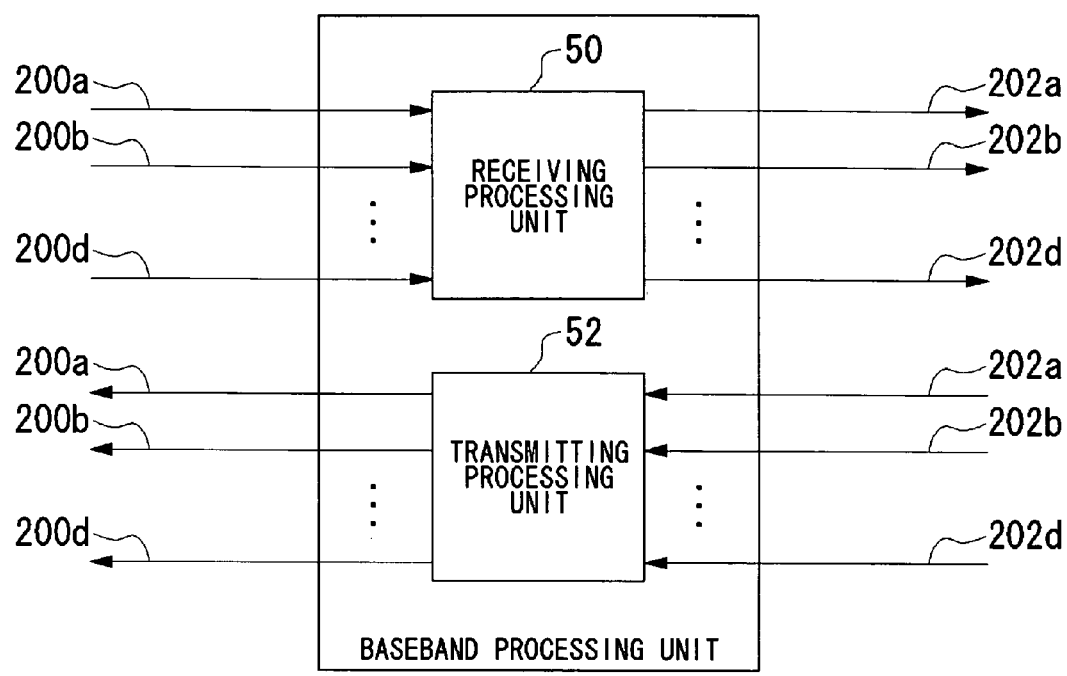
FIG. 15 illustrates a structure of a baseband processing unit shown in FIG. 13.

FIG. 15 illustrates a structure of a baseband processing unit 22. The baseband processing unit 22 includes a processing unit for use with receiving 50 and a processing unit for use with transmission 52. The receiving processing unit 50 executes a part, corresponding to a receiving operation, of operations by the baseband processing unit 22. That is, the receiving processing unit 50 performs adaptive array signal processing on time-domain signals 200 and therefore derives receiving weight vectors. Then the receiving processing unit 50 outputs the result of array synthesis as the frequency-domain signal 202. It is to be noted here that the receiving processing unit 50 may generate rate information based on the frequency-domain signals 202. As for the generation of rate information, a known technique serves the purpose as mentioned above and the explanation thereof is omitted here.

The transmitting processing unit 52 executes a part, corresponding to a transmission operation, of operations by the baseband processing unit 22. That is, the transmitting processing unit 52 converts the frequency-domain signal 202 so as to generate the time-domain signal 200. The transmitting unit 52 associates a plurality of streams with a plurality of antennas 12, respectively. The transmitting processing unit 52 applies CDD as shown in FIGS. 12A to 12C. The transmitting processing unit 52 may execute an operation using a steering matrix. The transmitting processing unit 52 outputs finally the time-domain signals 200. On the other hand, the transmitting processing unit 52 may execute beamforming when transmitting the packet signals. As for the beamforming, a known technique serves the purpose as mentioned above and the explanation thereof is omitted here.

Figure 16:
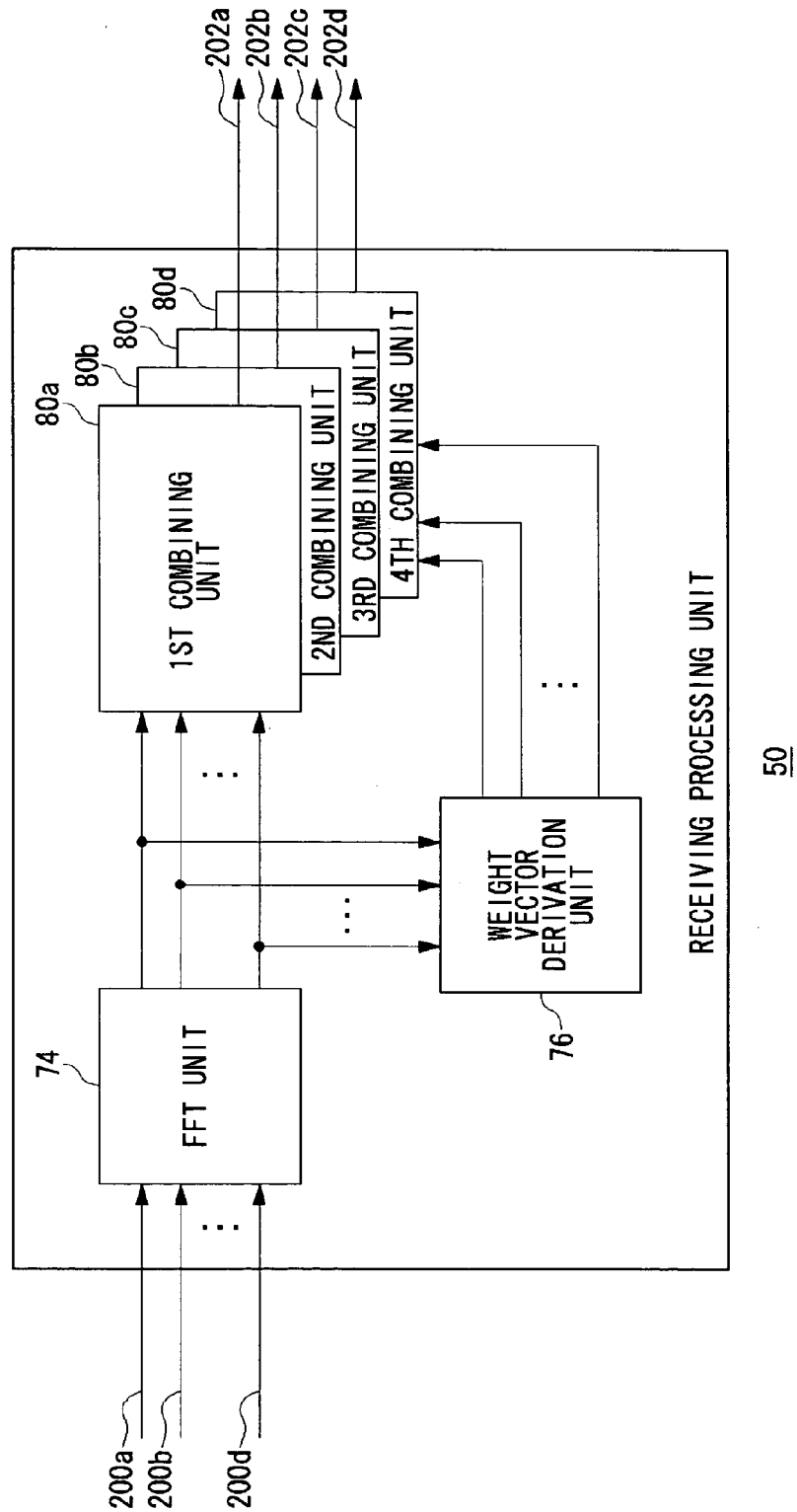
FIG. 16 illustrates a structure of a receiving processing unit shown in FIG. 15.

FIG. 16 illustrates a structure of the receiving processing unit 50. The receiving processing unit 50 includes an FFT unit 74, a weight vector derivation unit 76, and a first combining unit 80a, a second combining unit 80b, a third combining unit 80c and a fourth combining unit 80d, which are generically referred to as "combining unit 80".

The FFT unit 74 performs FFT on the time-domain signal 200 so as to convert the time-domain signal 200 into a frequency-domain value. It is assumed here that the frequency-domain value is structured as shown in FIG. 14. That is, a frequency-domain value for one time-domain signal 200 is outputted via one signal line.

The weight vector derivation unit 76 derives a weight vector from a frequency-domain value, on a subcarrier-by-subcarrier basis. The weight vector is so derived as to correspond to each of a plurality of streams, and a weight vector for one stream contains factors corresponding to the number of antennas, for each stream. HT-LTF and the like are used in deriving a weight vector corresponding to each of a plurality of streams. To derive the weight vector, an adaptive algorithm may be used or a channel characteristics may be used. Since a known technique may be employed in the processing for the adaptive algorithm and so forth, the explanation thereof is omitted here. When deriving the weight vector, the weight vector derivation unit 76 executes an operation of the first component minus (−) the second component plus (+) the third component minus (−) the fourth component or the like, as described earlier. As also described above, the weights are derived finally for each of subcarriers, antennas 12 and streams, respectively.

The combining unit 80 combines the frequency-domain value converted by the FFT unit 74 and the weight vector from the weight vector derivation unit 76. For example, as the weight vector to which a multiplication is to be executed, a weight which corresponds to both one subcarrier and the first stream is selected from among the weight vectors from the weight vector derivation unit 76. The selected weight has a value corresponding to each antenna 12.

As another weight vector to which a multiplier is to be executed, a value corresponding to one subcarrier is selected from among the frequency-domain values converted by the FFT unit 74. The selected value contains a value corresponding to each antenna 12. Note that both the selected weight and the selected value belong to the same subcarrier. While being associated respectively with the antennas 12, the selected weight and the selected value are respectively multiplied and the multiplication results are summed up. As a result, a value corresponding to one subcarrier in the first stream is derived. In the first combining unit 80a, the above-described processing is performed on the other subcarriers so as to derive data corresponding to the first stream. The similar processing is carried out to derive data corresponding respectively to the second to fourth streams. The derived first to fourth streams are outputted as the first frequency-domain signal 202a to the fourth frequency-domain signal 202d, respectively.

Figure 17:
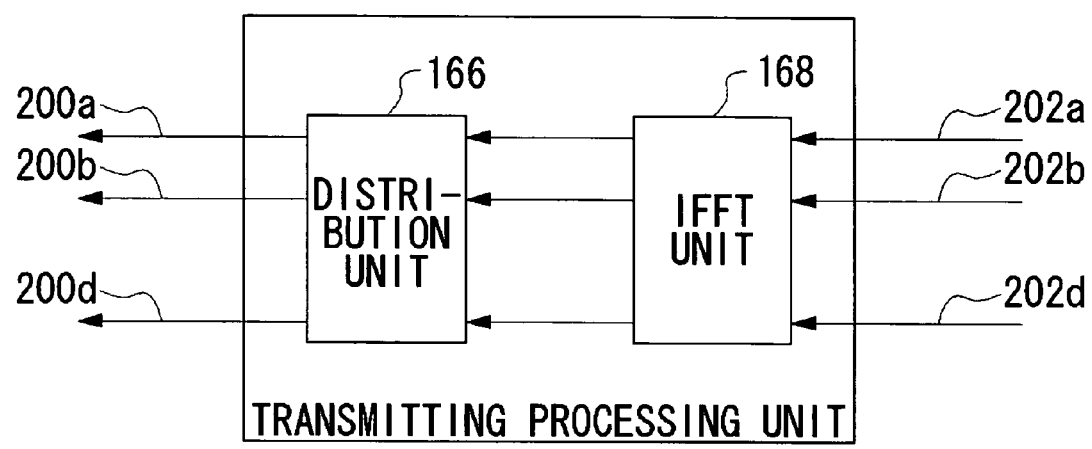
FIG. 17 illustrates a structure of a transmitting processing unit shown in FIG. 15.

FIG. 17 illustrates a structure of the transmitting processing unit 52. The transmitting processing unit 52 includes a distribution unit 166 and an IFFT unit 168. The IFFT unit 168 performs IFFT on the frequency-domain signals 202 and then outputs time-domain signals. As a result thereof, the IFFT unit 168 outputs the time-domain signal corresponding to each stream.

The distribution unit 166 associates the streams from the IFFT unit 168 with the antennas 12. To produce the packet signals corresponding to FIGS. 10A and 10B, FIGS. 11A and 11B and FIGS. 12A to 12C, the distribution unit 166 carries out CDD. CDD is expressed as a matrix C in the following Equation (6).

$$C(\lambda)=\mathrm{diag}(1,\exp(-j2\pi\lambda\delta/Nout),\Lambda,\exp(-j2\pi\lambda\delta(Nout-1)/Nout) \quad (6)$$

where δ indicates a shift amount and λ a subcarrier number. The multiplication of the matrix C by a stream is done on a subcarrier-by-subcarrier basis. That is, the distribution unit 166 carries out a cyclic time shifting within the L-STF and so forth per stream. The amount of timing shift is set to the above-described degree of priority.

The distribution unit 166 may multiply respectively the training signals produced, as in FIGS. 12A to 12C, by a steering matrix so as to increase the number of streams for training signal up to the number of a plurality of streams. FIG. 18 shows a packet format of packet signals finally transmitted in the communication system 100. FIG. 18 is equivalent to a case where the packet signals of FIG. 12A are deformed. The first stream and the second stream in FIG. 12A undergo the operation by an orthogonal matrix described later. As a result, "HT-LFT1" to "HT-LTF12" and so forth are produced. The CDD in timing shift amounts of "0 ns", "−50 ns", "−100 ns"

and "−150 ns" is applied to the first to the fourth stream, respectively. The absolute value of timing shift amount in the CDD for the second is so set as to be smaller than the absolute value of timing shift amount in the initial CDD applied. The similar processing is carried out to "HT-LTFs" and so forth assigned to the third and the fourth stream. The similar processing is carried out to the packet format of signals shown in FIG. 12B so as to produce packet signals using the first to fourth streams.

Now, before carrying out multiplication, the distribution unit 166 extends the degree of inputted signals to the number of a plurality of streams. In the case of FIG. 12A, the number of signals inputted is "2" in "HT-STF" and the like assigned to the first and the second stream, and this will be represented by "Nin" here. Accordingly, the inputted data are indicated by a vector of "Nin×1". The number of a plurality of streams is "4" and this is represented by "Nout" here. The distribution unit 166 extends the degree of inputted data to Nout from Nin. In other words, the vector of "Nin×1" is extended to the vector of "Nout×1". In so doing, "0" is inserted to components from the (Nin+1)th row to the Nout-th row. On the other hand, the component up to Nin are "0's" for "HT-LTF", and HT-LTF (−200 ns) and the like are inserted to the components from (Nin+1)th row to the Nout-th row A steering matrix is expressed by the following Equation (7).

$$S(\lambda)=C(\lambda)W \quad (7)$$

The steering matrix is a matrix of "Nout×Nout". W is an orthogonal matrix of "Nout×Nout". An example of the orthogonal matrices is a Walsh Matrix. Here, λ is the subcarrier number, and the multiplication by a steering matrix is done on a subcarrier-by-subcarrier basis. C denotes CDD as described above. Here, the amounts of timing shift are so defined as to differ for a plurality of streams, respectively.

According to the second embodiment, even in the case when one of known signals for use in channel estimation is to be assigned in L-SIG' and L-LTF in the main streams, all of the known signals for use in channel estimation are assigned to HT-LTF in the sub-streams. Hence, the channel corresponding to the sub-streams can be estimated without using L-SIG'. One of known signals for use in channel estimation is assigned to L-SIG' and L-LTF in the main streams, thus improving the transmission efficiency. All of the known signals for use in channel estimation are assigned to HT-LTF, so that the degradation in channel estimation associated with the sub-streams can be restricted. The short format and the long format are defined beforehand. And L-LTF and the like in the short format are used for the main streams whereas HT-LTF and the like in the long format are used for the sub-streams, so that the processing can be simplified.

Also, the number of streams to which HT-STF is assigned is the same as the number of streams to which data is assigned when generating a training signal. Hence, the gain set by HT-STF is in correspondence to data, thus preventing the worsening of data receiving characteristics. In generating a training signal, the timings at which L-LTF, L-SIG', HT-LTF and Data are assigned respectively in a main stream are shifted from the timing of HT-LTF assigned to a sub-stream so as to get the received powers of both the streams closer to each other. As a result of this getting the received powers of both the streams closer to each other, even when HT-STF is not assigned to the stream where data is not assigned, it is possible to prevent any worsening of estimation of channel characteristics by said stream.

More of the same timing shift amounts can be used by defining the degrees of priority for the timing shift amounts and using the timing shift amounts in order from one with the highest degree of priority for both the stream where data is assigned and the stream where data is not assigned. Moreover, the processing may be made simpler by using more of the same timing shift amounts. Further, when the number of a plurality of streams is "2" and the number of streams to which data is assigned is "1", a receiving apparatus may instruct a transmitting apparatus which of the plurality of streams is to have data assigned, according to the receiving condition of L-LTF and/or HT-LTF. In other words, it is possible to execute transmission diversity.

Since the timing shift amounts for the respective HT-LTFs assigned to a plurality of streams are of the same values, a receiving apparatus can cope easily when there are changes in streams that have data assigned. Since different timing shift amounts are set for a plurality of streams, respectively, the processing can be carried out uniformly. Moreover, such a uniformly performed processing makes the processing simpler. Even when the number of streams where data is assigned increases in the subsequent packet signal, the HT-LTF for the stream to have the increase thereof has already been transmitted with the same timing shift amount, so that the receiving apparatus can use the already derived timing and the like. Since it can use the already derived timing and the like, the receiving apparatus can easily cope with the increase in the number of streams where data is assigned.

The present invention has been described based on the embodiments. These embodiments are merely exemplary, and it is understood by those skilled in the art that various modifications to the combination of each component and process thereof are possible and that such modifications are also within the scope of the present invention.

According to the first embodiment of the present invention, an adding unit 66 appends dummy signals as additional signals. The embodiment, however, is not limited thereto, and the adding unit 66 may, for instance, add signals for parity check as additional signals instead. This modification may contribute to a more effective use of additional signals and improved receiving characteristics. For this modification, it is only required that additional signals be added whose number of subcarriers is equal to the difference between the number of subcarriers used for data signals and the number of subcarriers used for control signals.

According to the first embodiment of the present invention, an adding unit 66 adds dummy signals as additional signals. The embodiment, however, is not limited thereto, and the adding unit 66 may, for instance, add pilot signals as additional signals instead. The pilot signals are known signals. In this modification, the adding unit 66 assigns pilot signals to subcarriers with subcarrier numbers "−28", "−27", "27" and "28" as shown in FIG. 1. Also, the receiving apparatus uses the pilot signals in carrying out demodulation. It is to be noted that where there are already pilot signals inserted in a plurality of subcarriers with subcarrier numbers from "−26" to "26", the addition of pilot signals by the adding unit 66 is equivalent to the addition of pilot signals. This modification may contribute to improved receiving characteristics. For this modification, the only requirement is such that additional signals be added whose number of subcarriers is equal to the difference between the number of subcarriers used for data signals and the number of subcarriers used for control signals.

According to the second embodiment of the present invention, a signal compatible with the legacy system is added in a leading part of a packet format. As a result, the adding unit 66 does not add an additional signal to the leading control signal "HT-SIG". The arrangement, however, is not limited thereto, and it may be that no signal compatible with the legacy system is added in the leading part of a packet format. Accordingly, the adding unit 66 may add additional signals to all the control signals. According to this modification, the same processing is done on all the control signals, so that the processing can be simpler. For this modification, therefore, the only requirement is such that additional signals be added whose number of subcarriers is equal to the difference between the number of subcarriers used for data signals and the number of subcarriers used for control signals.

According to the first embodiment of the present invention, it is assumed that the communication system 100 is a MIMO system. The arrangement, however, is not limited thereto, and it may be that the communication system 100 is not a MIMO system. In other words, the arrangement may be such that signals of a single stream are transmitted from a single antenna 12. According to this modification, the present invention can be applied to a variety of communication systems. That is, the only requirement is that a plurality of subcarriers are used and there is a need to control the variation in the number of subcarriers in the course of a packet signal.

According to the second embodiment of the present invention, the description has been given of a case when the number of multistreams is "4". However, the present invention is not limited thereto and, for example, the number of a plurality of streams may be less than "4" or may be greater than "4". Along with this example, the number of antennas 12 may be less than "4" in the former case and may be greater than 4" in the latter case. According to this modification, the present invention can be applied to a variety of the number of streams.

The present invention described in the first and the second embodiment may be described by the following Item 1-1 to Item 1-15, Item 2-1 and Item 3-1 to Item 3-9:

Item 1-1

A radio apparatus, comprising:

an input unit which inputs a plurality of combinations of control signal and data signal wherein the combination uses a plurality of subcarriers;

an interleave unit which performs interleaving of a size defined by a first number of subcarriers on a control signal and performs interleaving of a size defined by a second number of subcarriers on a data signal in the plurality of combinations inputted to the input unit; and an adding unit which adds an additional signal to a control signal contained in a second combination and the subsequent combination, wherein the adding unit adds additional signals whose amount corresponds to a difference between the second number of subcarriers and the first number of subcarriers.

Item 1-2

A radio apparatus as described in Item 1-1, wherein the additional signal inserted by the adding unit is a dummy signal.

Item 1-3

A radio apparatus as described in Item 1-1, wherein the additional signal inserted by the adding unit is a signal for parity check.

Item 1-4

A radio apparatus as described in Item 1-1, wherein the additional signal inserted by the adding unit is a known signal.

Item 1-5

A radio apparatus, comprising:

an input unit which inputs a plurality of combinations of control signal and data signal wherein the combination uses a plurality of subcarriers;

an adding unit which adds an additional signal to a control signal contained in a second combination and the subsequent combination; and an interleave unit which performs interleaving of a size defined by a first number of subcarriers on a control signal contained in a first combination and performs interleaving of a size defined by a second number of subcarriers on the remaining signals among a plurality of combinations to which the additional signal has been added, wherein the adding unit adds additional signals whose amount corresponds to a difference between the second number of subcarriers and the first number of subcarriers.

Item 1-6

A radio apparatus as described in Item 1-5, wherein the additional signal inserted by the adding unit is a signal for cyclic redundancy check (CRC).

Item 1-7

A radio apparatus as described in Item 1-5, wherein the additional signal inserted by the adding unit is a known signal.

Item 1-8

A radio apparatus, comprising:

a receiver which receives a plurality of combinations of control signal and data signal wherein the combination uses a plurality of subcarriers;

an excluding unit which excludes an additional signal from a control signal contained in a second combination and the subsequent combination among the plurality of combinations received by the receiver; and a deinterleave unit which performs deinterleaving of a size defined by a first number of subcarriers on a control signal and performs deinterleaving of a size defined by a second number of subcarriers on a data signal in a plurality of combinations in which the additional signal has been excluded by the excluding unit, wherein the excluding unit excludes additional signals whose amount corresponds to a difference between the second number of subcarriers and the first number of subcarriers.

Item 1-9

A radio apparatus, comprising:

a receiver which receives a plurality of combinations of control signal and data signal wherein the combination uses a plurality of subcarriers;

a deinterleave unit which performs deinterleaving of a size defined by a first number of subcarriers on a control signal contained in a first combination and performs deinterleaving of a size defined by a second number of subcarriers on the remaining signals among the plurality of combinations received by the receiver; and an excluding unit which excludes an additional signal from a control signal contained in a second and the subsequent combination among the plurality of combinations deinterleaved by the deinterleave unit, wherein the excluding unit excludes additional signals whose amount corresponds to a difference between the second number of subcarriers and the first number of subcarriers.

Item 1-10

A radio apparatus, comprising:

an input unit which inputs a plurality of combinations of control signal and data signal wherein the combination uses a plurality of subcarriers;

an interleave unit which performs interleaving of a size defined by a first number of subcarriers on a control signal and performs interleaving of a size defined by a second number of subcarriers on a data signal in the plurality of combinations inputted to said input unit; and an adding unit which adds an additional signal to a control signal in a plurality of combinations interleaved by the interleave unit, wherein the adding unit adds additional signals whose amount corresponds to a difference between the second number of subcarriers and the first number of subcarriers.

Item 1-11

A radio apparatus, comprising:

an input unit which inputs a plurality of combinations of control signal and data signal wherein the combination uses a plurality of subcarriers;

an adding unit which adds an additional signal to a control signal in the plurality of combinations inputted to the input unit; and an interleave unit which performs interleaving of a size defined by a predetermined number of subcarriers in a plurality of combinations to which the additional signal has been added by the adding unit, wherein the adding unit adds additional signals whose amount corresponds to a difference between the number of subcarriers corresponding to control signals other than the additional signal and the number of subcarriers corresponding to the data signal.

Item 1-12

A radio apparatus, comprising:

a receiver which receives a plurality of combinations of control signal and data signal wherein the combination uses a plurality of subcarriers;

an excluding unit which excludes an additional signal from a control signal in the plurality of combinations received by the receiver; and a deinterleave unit which performs deinterleaving of a size defined by a first number of subcarriers on a control signal and performs deinterleaving of a size defined by a second number of subcarriers on a data signal in the plurality of combinations in which the additional signal has been excluded by the excluding unit, wherein the excluding unit excludes additional signals whose amount corresponds to a difference between the second number of subcarriers and the first number of subcarriers.

Item 1-13

A radio apparatus, comprising:

a receiver which receives a plurality of combinations of control signal and data signal wherein the combination uses a plurality of subcarriers;

a deinterleave unit which performs deinterleaving of a size defined by a predetermined number of subcarriers in the plurality of combinations received by the receiver; and an excluding unit which excludes an additional signal from a control signal in a plurality of combinations deinterleaved by the deinterleave unit, wherein the excluding unit excludes additional signals whose amount corresponds to a difference between the number of subcarriers corresponding to the control signals other than the additional signal and the number of subcarriers corresponding to a data signal.

Item 1-14

A radio apparatus, comprising:

a generator which generates a packet signal in which a control signal is assigned to any internal within the packet signal, the packet signal using a plurality of subcarriers; and a transmitter which transmits the packet signal generated by the generator, wherein the generator adds an additional signal to a control signal, whose number of subcarriers required is less than the number of subcarriers used in a preceding interval, in such a manner that the number of subcarriers required equals the number of subcarriers used in the preceding interval.

Item 1-15

A radio apparatus as described in Item 1-14, wherein the generator generates also a packet signal such that the number of subcarriers required of a control signal is equal to the number of subcarriers used in a preceding interval, and wherein when generating said packet signal, the generator stops adding the additional signal.

Item 2-1

A radio apparatus, comprising:

a receiver which receives a packet signal in which a control signal is assigned to any internal within the packet signal, the packet signal using a plurality of subcarriers;

an identifying unit which identifies a form of the packet signal received by the receiver; and a processing unit which processing the packet signal received by the receiver, according to the format of the packet signal identified by the identifying unit, wherein, in a first format of the packet signal identified by the identifying unit, an additional signal is added to a control signal, whose number of subcarriers required is less than the number of subcarriers used in a preceding interval, in such a manner that the number of subcarriers required equals the number of subcarriers used in the preceding interval; in a second format of the packet signal, the number of subcarriers required by the control signal equals the number of subcarriers used in the preceding interval, and wherein for the first format the processing unit excludes the additional signal and then performs processing on the control signal, whereas for the second format the processing unit performs processing on the control signal without excluding the additional signal.

Item 3-1

A radio apparatus for transmitting a packet signal formed by a plurality of streams wherein the packet signal is formed by a plurality of carriers, the apparatus comprising:

a generator which generates the packet signal in a manner that, while a data signal is assigned to at least one main stream of a plurality of streams and a known signal and a control signal are assigned anterior to the data signal in the main stream, for a sub-stream to which no data signal is assigned, an extensional known signal is assigned to timing, other than timing at which a known signal, a control signal and a data signal in the main stream are assigned respectively; and a transmitter which transmits the packet signal generated by the generator, wherein while defining in a manner that the number of carriers in one of known signals assigned to the main stream is made smaller than the number of carriers in a data signal, the generator defines in a manner that a known component corresponding to carriers not contained in the one of known signals is contained in a control signal, and defines in a manner that the number of carriers in an extensional known signal assigned to the sub-stream is made equal to the number of carriers in a data signal.

Item 3-2

A radio apparatus as described in Item 3-1, wherein the generator defines a first packet format arranged in the order of one of known signals, a control signal and a data signal and defines a second packet format arranged in the order of a known signal, defined by the same number of carriers as that in a data signal, and the data signal, and uses the known signal and the control signal defined by the first format to transmit a known component in the main streams and uses the known signal defined by the second packet format to transmit a known component in the sub-stream.

Item 3-3

A radio apparatus as described in Item 3-1, wherein, with a known signal, assigned to one of main streams, serving as a reference, the generator performs cyclic timing shift within a known signal on known signals assigned to the other streams and at the same time performs also timing shift on an extensional signal assigned to a sub-stream and wherein a timing shift amount is given a predetermined degree of priority whereby the timing shift amount is used for a main stream in order of decreasing degrees of priority and the timing shift amount is used for a sub-stream also in order of decreasing degrees of priority.

Item 3-4

A radio apparatus as described in Item 3-1, wherein, with a known signal, assigned to one of main streams, serving as a reference, the generator performs cyclic timing shift within a known signal on known signals assigned to the other streams and at the same time performs also timing shift on an extensional signal assigned to a sub-stream and wherein a different value of timing shift amount is set to each of a plurality of streams.

Item 3-5

A radio apparatus as described in Item 3-3 or Item 3-4, wherein the known signal and the extensional known signal are formed by repeating a predetermined unit in time domain and wherein a combination of signs of predetermined units is defined so that orthogonality relation holds among streams and at the same time the combination of signs of predetermined units is fixed.

The "predetermined unit" may be defined not only in the time domain but also in the frequency domain. In the latter case, the periods corresponding respectively to a plurality of units may differ when the predetermined unit is converted to the time domain.

Item 3-6

A radio apparatus as described in Item 3-3 or Item 3-4, wherein the known signal and the extensional known signal are formed by repeating a predetermined unit in time domain and wherein a combination of signs of predetermined units is defined so that orthogonality relation holds among streams and at the same time the combination of signs of predetermined units is given a predetermined degree of priority whereby the combination of sign is used, for a stream to which a data signal is assigned, in order of decreasing degrees of priority and the combination of signs is used, for a stream to which no data signal is assigned, also in order of decreasing degrees of priority.

Item 3-7

A radio apparatus as described in any of Item 3-3 to Item 3-6, wherein the generator performs cyclic timing shift on the data signal and wherein a timing shift amount for a main stream is used as the timing shift amount.

Item 3-8

A radio apparatus as described in any of Item 3-3 to Item 3-7, further comprising a deformation unit which deforms or modifies the packet signal generated by the generator and the deformed or modified packet signal to the transmitter, the deformation unit including:

a first processing unit which extends the number of main streams to the number of a plurality of streams and then applies cyclic timing shift within a known signal to known signals assigned to the other streams wherein a known signal assigned to one of the extended streams serves as a reference; and a second processing unit which extends the number of sub-streams to the number of a plurality of streams and then applies cyclic timing shift within an extensional known signal to extensional known signals assigned to the other streams wherein an extensional known signal assigned to one of the extended streams serves as a reference, wherein each of timing shift amounts used for the streams extended by the first processing unit is so set as to equal each of timing shift amounts used for the streams extended by the second processing unit.

Item 3-9

A radio apparatus as described in Item 3-8, wherein the absolute value of timing shift amount in the generator is so set as to be larger than the absolute value of timing shift amount in the deformation unit.

While the preferred embodiments of the present invention have been described using specific terms, such description is for illustrative purposes only, and it is to be understood that changes and variations may be made without departing from the spirit or scope of the appended claims.

What is claimed is:

1. A radio apparatus, comprising:
   an input unit which inputs a plurality of combinations of control signal and data signal wherein a combination uses a plurality of subcarriers;
   an interleave unit which performs interleaving of a size defined by a first number of subcarriers on a control signal and performs interleaving of a size defined by a second number of subcarriers on a data signal in the plurality of combinations inputted to said input unit; and
   an adding unit which adds an additional signal to a control signal contained in a second combination and the subsequent combination,
   wherein said adding unit adds additional signals whose amount corresponds to a difference between the second number of subcarriers and the first number of subcarriers.

2. A radio apparatus according to claim 1, wherein the additional signal inserted by said adding unit is a dummy signal.

3. A radio apparatus according to claim 1, wherein the additional signal inserted by said adding unit is a signal for parity check.

4. A radio apparatus, comprising:
   an input unit which inputs a plurality of combinations of control signal and data signal wherein a combination uses a plurality of subcarriers;
   an adding unit which adds an additional signal to a control signal contained in a second combination and the subsequent combination; and
   an interleave unit which performs interleaving of a size defined by a first number of subcarriers on a control signal contained in a first combination and performs interleaving of a size defined by a second number of subcarriers on the remaining signals among a plurality of combinations in which the additional signal has been added by said adding unit,
   wherein said adding unit adds additional signals whose amount corresponds to a difference between the second number of subcarriers and the first number of subcarriers.

5. A radio apparatus according to claim 4, wherein the additional signal inserted by said adding unit is a signal for cyclic redundancy check (CRC).

6. A radio apparatus, comprising:
a receiver which receives a plurality of combinations of control signal and data signal wherein a combination uses a plurality of subcarriers;
an excluding unit which excludes an additional signal from a control signal contained in a second combination and the subsequent combination among the plurality of combinations received by said receiver; and
a deinterleave unit which performs deinterleaving of a size defined by a first number of subcarriers on a control signal and performs deinterleaving of a size defined by a second number of subcarriers on a data signal in a plurality of combinations in which the additional signal has been excluded by said excluding unit,
wherein said excluding unit excludes additional signals whose amount corresponds to a difference between the second number of subcarriers and the first number of subcarriers.

7. A radio apparatus, comprising:
a receiver which receives a plurality of combinations of control signal and data signal wherein a combination uses a plurality of subcarriers;
a deinterleave unit which performs deinterleaving of a size defined by a first number of subcarriers on a control signal contained in a first combination and performs deinterleaving of a size defined by a second number of subcarriers on the remaining signals among the plurality of combinations received by said receiver; and
an excluding unit which excludes an additional signal from a control signal contained in a second combination and the subsequent combination among the plurality of combinations deinterleaved by said deinterleave unit,
wherein said excluding unit excludes additional signals whose amount corresponds to a difference between the second number of subcarriers and the first number of subcarriers.

8. A radio apparatus, comprising:
an input unit which inputs a plurality of combinations of control signal and data signal wherein a combination uses a plurality of subcarriers;
an interleave unit which performs interleaving of a size defined by a first number of subcarriers on a control signal and performs interleaving of a size defined by a second number of subcarriers on a data signal in the plurality of combinations inputted to said input unit; and
an adding unit which adds an additional signal to a control signal in a plurality of combinations interleaved by said interleave unit,
wherein said adding unit adds additional signals whose amount corresponds to a difference between the second number of subcarriers and the first number of subcarriers.

9. A radio apparatus, comprising:
an input unit which inputs a plurality of combinations of control signal and data signal wherein a combination uses a plurality of subcarriers;
an adding unit which adds an additional signal to a control signal in the plurality of combinations inputted to said input unit; and
an interleave unit which performs interleaving of a size defined by a predetermined number of subcarriers in a plurality of combinations in which the additional signal has been added by said adding unit,
wherein said adding unit adds additional signals whose amount corresponds to a difference between the number of subcarriers corresponding to control signals other than the additional signal and the number of subcarriers corresponding to the data signal.

10. A radio apparatus, comprising:
a receiver which receives a plurality of combinations of control signal and data signal wherein a combination uses a plurality of subcarriers;
an excluding unit which excludes an additional signal from a control signal in the plurality of combinations received by said receiver; and
a deinterleave unit which performs deinterleaving of a size defined by a first number of subcarriers on a control signal and performs deinterleaving of a size defined by a second number of subcarriers on a data signal in the plurality of combinations in which the additional signal has been excluded by said excluding unit,
wherein said excluding unit excludes additional signals whose amount corresponds to a difference between the second number of subcarriers and the first number of subcarriers.

11. A radio apparatus, comprising:
a receiver which receives a plurality of combinations of control signal and data signal wherein a combination uses a plurality of subcarriers;
a deinterleave unit which performs deinterleaving of a size defined by a predetermined number of subcarriers in the plurality of combinations received by said receiver; and
an excluding unit which excludes an additional signal from a control signal in a plurality of combinations deinterleaved by said deinterleave unit,
wherein said excluding unit excludes additional signals whose amount corresponds to a difference between the number of subcarriers corresponding to the control signals other than the additional signal and the number of subcarriers corresponding to a data signal.

* * * * *